(12) United States Patent
Liu et al.

(10) Patent No.: US 10,666,331 B2
(45) Date of Patent: May 26, 2020

(54) TERMINAL APPARATUS, BASE STATION APPARATUS, COMMUNICATION METHOD, AND INTEGRATED CIRCUIT

(71) Applicants: Sharp Kabushiki Kaisha, Sakai, Osaka (JP); FG Innovation Company Limited, New Territories (HK)

(72) Inventors: Liqing Liu, Sakai (JP); Shoichi Suzuki, Sakai (JP); Wataru Ouchi, Sakai (JP); Tatsushi Aiba, Sakai (JP); Takashi Hayashi, Sakai (JP); Tomoki Yoshimura, Sakai (JP)

(73) Assignees: FG INNOVATION COMPANY LIMITED, New Territories (HK); SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/312,306

(22) PCT Filed: Jun. 15, 2017

(86) PCT No.: PCT/JP2017/022200
§ 371 (c)(1),
(2) Date: Dec. 21, 2018

(87) PCT Pub. No.: WO2018/003530
PCT Pub. Date: Jan. 4, 2018

(65) Prior Publication Data
US 2019/0349046 A1    Nov. 14, 2019

(30) Foreign Application Priority Data

Jun. 28, 2016  (JP) ................................ 2016-127320

(51) Int. Cl.
| | | |
|---|---|---|
| *H04B 7/0456* | (2017.01) | |
| *H04B 17/336* | (2015.01) | |
| *H04B 7/06* | (2006.01) | |
| *H04W 24/10* | (2009.01) | |
| *H04W 72/04* | (2009.01) | |

(52) U.S. Cl.
CPC .......... *H04B 7/0486* (2013.01); *H04B 7/063* (2013.01); *H04B 7/0626* (2013.01); *H04B 17/336* (2015.01); *H04W 24/10* (2013.01); *H04W 72/0413* (2013.01); *H04W 72/0446* (2013.01)

(58) Field of Classification Search
CPC .. H04B 7/0486; H04B 17/336; H04B 7/0626; H04B 7/063; H04W 24/10; H04W 72/0413; H04W 72/0446; H04W 72/04
See application file for complete search history.

(56) References Cited

U.S. PATENT DOCUMENTS 10,257,737 B2 *  4/2019  Lee ........................... H04L 1/18
10,362,595 B2 *  7/2019  Lee ....................... H04L 1/0029

OTHER PUBLICATIONS

Official Communication issued in International Patent Application No. PCT/JP2017/022200, dated Sep. 5, 2017.
(Continued)

*Primary Examiner* — Vineeta S Panwalkar
(74) *Attorney, Agent, or Firm* — Keating & Bennett, LLP

(57) ABSTRACT

The terminal apparatus derives CSI, transmits the CSI, and determines content of the CSI based on a type of a downlink physical channel that is allocated to a CSI reference resource or allocated before and closest to the CSI reference resource.

10 Claims, 12 Drawing Sheets

(56) References Cited

OTHER PUBLICATIONS

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.2, Feb. 2016, 140 pages.
MediaTek Inc., "Channel design for shortened TTI in FDD", 3GPP TSG RAN WG1 Meeting #84bis, R1-162945, Apr. 11-15, 2016, pp. 1-6.
Huawei et al., "PDSCH design for short TTI", 3GPP TSG RAN WG1 Meeting #85, R1-164821, May 23-27, 2016, 3 pages.

* cited by examiner

Figure 7A: CQI and PMI Feedback Types for PUSCH/sPUSCH CSI reporting Modes

| | | PMI Feedback Type | | |
|---|---|---|---|---|
| | | No PMI | Single PMI | Multiple PMI |
| PUSCH/sPUSCH CQI Feedback Type | Wideband (wideband CQI) | Mode 1-0 | Mode 1-1 | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

Figure 7B: CQI and PMI Feedback Types for PUSCH/sPUSCH CSI reporting Modes

| | | PMI Feedback Type | | |
|---|---|---|---|---|
| | | No PMI | Single PMI | Multiple PMI |
| PUSCH/sPUSCH CQI Feedback Type | Wideband (wideband CQI) | Mode 1-0 | Mode 1-1 | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

Figure 8A: CQI and PMI Feedback Types for PUCCH/sPUCCH CSI reporting Modes

| PUCCH/sPUCCH CQI Feedback Type | | PMI Feedback Type | |
|---|---|---|---|
| | | No PMI | Single PMI |
| | Wideband (wideband CQI) | Mode 1-0 | Mode 1-1 |
| | UE Selected (subband CQI) | Mode 2-0 | Mode 2-1 |

Figure 8B: CQI and PMI Feedback Types for PUCCH/sPUCCH CSI reporting Modes

| PUCCH/sPUCCH CQI Feedback Type | PMI Feedback Type | |
|---|---|---|
| | No PMI | Single PMI |
| Wideband (wideband CQI) | Mode 1-0 | Mode 1-1 |
| UE Selected (subband CQI) | Mode 2-0 | Mode 2-1 |

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority right to Japanese Patent Application No. 2016-127320 filed in Japan on Jun. 28, 2016, the content of which is incorporated herein by reference.

BACKGROUND ART

A radio access scheme and a radio network for cellular mobile communication (hereinafter referred to as "Long Term Evolution (LTE)" or "Evolved Universal Terrestrial Radio Access: EUTRA") are being studied in 3rd Generation Partnership Project (3GPP) (NPL 1). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each area covered by a base station apparatus. Here, a single base station apparatus may manage a plurality of cells.

In the 3GPP, latency reduction enhancements have been studied. For example, as a solution for latency reduction, a semi-persistent scheduling (SPS), an uplink grant reception (UL grant reception), and activation and deactivation of a configured semi-persistent scheduling (Configured SPS activation and deactivation) are being studied (NPL 1).

CITATION LIST

NPL

NPL 1: "3GPP TR 36.881 V 0.5.2 (2016-02) Evolved Universal Terrestrial Radio Access (E-UTRA); Study on latency reduction techniques for LTE (Release 13)", R2-161963, Ericsson.

SUMMARY OF INVENTION

Technical Problem

However, in the wireless communication system as described above, a concrete method has not been adequately studied regarding a procedure in which the channel state information (CSI) is transmitted in the downlink.

One aspect of the present invention provides a terminal apparatus, a base station apparatus, a communication method, and an integrated circuit capable of efficiently transmitting channel state information.

Solution to Problem (1) To accomplish the object described above, aspects of the present invention are contrived to provide the following measures. Namely, the terminal apparatus according to a first aspect of the present invention is a terminal apparatus, including a channel measurement unit configured to derive CSI and a transmitter configured to transmit the CSI, wherein content of the CSI is determined based on a type of a downlink physical channel that is allocated to a CSI reference resource or allocated before and closest to the CSI reference resource.

(2) In addition, a base station apparatus according to a second aspect of the present invention is a base station apparatus, including a channel measurement unit configured to derive CSI, and a receiver configured to receive the CSI, wherein content of the CSI is determined based on a type of a downlink physical channel that is allocated to a CSI reference resource or allocated before and closest to the CSI reference resource.

(3) In addition, a method of communication used for a terminal apparatus according to a third aspect of the present invention is a method, including the steps of deriving CSI, and transmitting the CSI, wherein content of the CSI is determined based on a type of a downlink physical channel allocated to a CSI reference resource or allocated before and closest to the CSI reference resource.

(4) In addition, a method of communication used for a base station apparatus according to a forth aspect of the present invention is a method, including the steps of deriving CSI, and transmitting the CSI, wherein, content of the CSI is determined based on a type of a downlink physical channel that is allocated to a CSI reference resource or allocated before and closest to the CSI reference resource.

(5) Furthermore, according to a fifth aspect of the present invention, there is provided an integrated circuit mounted on a terminal apparatus, including a channel measurement circuit configured to derive CSI, a transmission circuit configured to transmit the CSI, wherein content of the CSI is determined based on a type of a downlink physical channel that is allocated to a CSI reference resource or allocated before and closest to the CSI reference resource.

(6) Furthermore, according to a sixth aspect of the present invention, there is provided an integrated circuit mounted on a base station apparatus, including a channel measurement circuit configured to derive CSI, and a reception circuit configured to receive the CSI, wherein content of the CSI is determined based on a type of a downlink physical channel that is allocated to a CSI reference resource or allocated before and closest to the CSI reference resource.

Advantageous Effects of Invention

One aspect of the present invention enables channel state information to be efficiently transmitted.

BRIEF DESCRIPTION OF DRAWINGS

FIG. 7A is a diagram illustrating an example of determining aperiodic CSI content in a case that the first aperiodic CSI reporting parameter in aspect E of the present embodiment is configured in common.

FIG. 7B is a diagram illustrating another example of determining aperiodic CSI content in a case that the first aperiodic CSI reporting parameter in aspect E of the present embodiment is configured in common.

FIG. 8A is a diagram illustrating an example of determining the content of periodic CSI in a case that the first periodic CSI reporting parameter in aspect E of the present embodiment is configured in common for PDSCH and sPDSCH.

FIG. 8B is a diagram illustrating another example of determining the content of periodic CSI in a case that the first periodic CSI reporting parameter in aspect E of the present embodiment is configured in common for PDSCH and sPDSCH.

DESCRIPTION OF EMBODIMENTS

Embodiments of the present invention will be described below.

Figure 1:
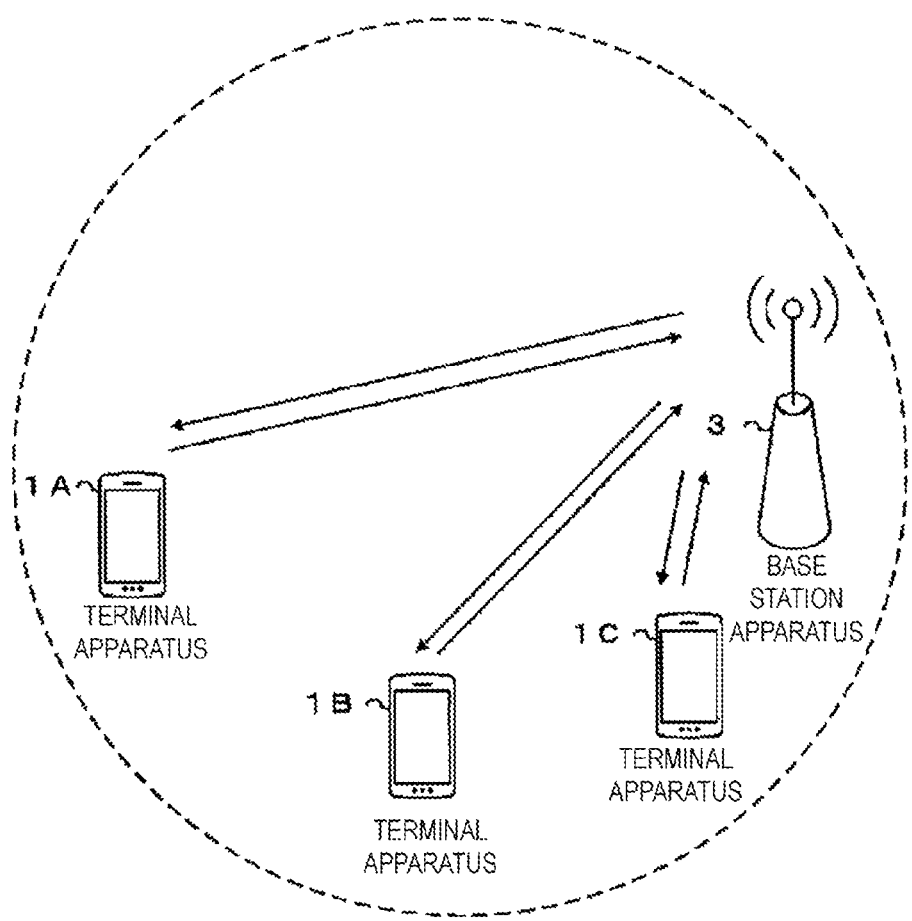
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, the terminal apparatuses 1A to 1C are each also referred to as a terminal apparatus 1.

Physical channels and physical signals according to the present embodiment will be described.

In FIG. 1, in the uplink radio communication from the terminal apparatus 1 to the base station apparatus 3, the following uplink physical channels are used. Here, the uplink physical channels are used to transmit information output from the higher layers.

a Physical Uplink Control Channel (PUCCH)
a short Physical Uplink Control Channel, a PUCCH for short TTI (sPUCCH)
a Physical Uplink Shared Channel (PUSCH)
a short Physical Uplink Shared Channel, a PUSCH for short TTI (sPUSCH)
a Physical Random Access Channel (PRACH)
a short Physical Random Access Channel, a PRACH for short TTI (sPRACH)

The PUCCH and/or the sPUCCH are used to transmit uplink control information (UCI). Hereinafter, the PUCCH may include the sPUCCH. Here, the uplink control information may include channel state information (CSI) for the downlink. In addition, the uplink control information may include a scheduling request (SR) used for requesting resources of the UL-SCH. The uplink control information may include Hybrid Automatic Repeat reQuest ACKnowledgment (HARQ-ACK).

Here, HARQ-ACK may indicate HARQ-ACK for downlink data (Transport block, Medium Access Control Protocol Data Unit: MAC PDU, Downlink-Shared Channel: DL-SCH, Physical Downlink Shared Channel: PDSCH). Namely, HARQ-ACK may indicate ACK (acknowledgment, positive-acknowledgment) or NACK (negative-acknowledgment) for downlink data. In addition, the CSI may include a channel quality indicator (CQI), a precoding matrix indicator (PMI), and/or a rank indication (RI).

PUSCH and/or sPUSCH are used to transmit Uplink-Shared Channel (UL-SCH). Hereinafter, the PUSCH may include sPUSCH. Furthermore, the PUSCH may be used to transmit HARQ-ACK and/or CSI along with the uplink data. Furthermore, the PUSCH may be used to transmit CSI only or HARQ-ACK and CSI only. Namely, the PUSCH may be used to transmit the uplink control information only.

Here, the base station apparatus 3 and the terminal apparatus 1 may exchange (transmit and receive) signals in a higher layer. For example, the base station apparatus 3 and the terminal apparatus 1 may transmit and receive RRC signaling (also referred to as the RRC message or the RRC information) in the radio resource control (RRC) layer. Further, the base station apparatus 3 and the terminal apparatus 1 may exchange (transmit and receive) MAC control elements in the MAC (Medium Access Control) layer. Here, the RRC signaling and/or the MAC control element is also referred to as higher layer signaling.

Here, in the present embodiment, the terms "higher layer parameter", "higher layer message", "higher layer signal", "higher layer information" and "higher layer information component" may have the same meaning.

Also, the PUSCH may be used to transmit RRC signaling and MAC control elements. Here, the RRC signaling transmitted from the base station apparatus 3 may be signaling common to multiple terminal apparatuses 1 in a cell. In addition, the RRC signaling transmitted from the base station apparatus 3 may be signaling dedicated to a certain terminal apparatus 1 (also referred to as dedicated signaling). Namely, user-equipment-specific information (the information unique to user equipment) may be transmitted through signaling dedicated to the certain terminal apparatus 1.

The PRACH and/or the sPRACH are used to transmit a random access preamble. Hereinafter, the PRACH may include the sPRACH. For example, the PRACH (or the random access procedure) is used mainly for the terminal apparatus 1 to synchronize with the base station apparatus 3 in the time domain. The PRACH (or random access procedure) may be used for an initial connection establishment procedure, a handover procedure, a connection re-establishment procedure, a synchronization for uplink transmission (timing adjustment), and a scheduling request (request for PUSCH resource, request for UL-SCH resource).

In FIG. 1, the following uplink physical signal is used in the uplink radio communication. Here, the uplink physical signal is not used to transmit the information output from the higher layers but is used by the physical layer.

Uplink Reference Signal (UL RS)
According to the present embodiment, the following two types of uplink reference signals are used.
Demodulation reference signal (DMRS)
Sounding reference signal (SRS)

The DMRS is associated with the transmission of the PUSCH, the sPUSCH, and/or the PUCCH. Namely, the DMRS may be time-multiplexed with the PUSCH, the sPUSCH, or the PUCCH. For example, the base station apparatus 3 may use the DMRS to perform channel compensation of the PUSCH, the sPUSCH, or the PUCCH.

Hereinafter, transmitting the PUSCH and the DMRS together is also referred to simply as transmitting the PUSCH (transmitting on the PUSCH). Also, transmitting the sPUSCH and the DMRS together is also referred to simply as transmitting the sPUSCH (transmitting on the sPUSCH). Also, transmitting the PUCCH and the DMRS together is also referred to simply as transmitting the PUCCH (transmitting on PUCCH).

The SRS is not associated with the transmission of the PUSCH or the PUCCH. For example, the base station apparatus 3 may use the SRS to measure uplink channel conditions.

In FIG. 1, the following downlink physical channels are used for downlink radio communication from the base station apparatus 3 to the terminal apparatus 1. Here, the downlink physical channels are used to transmit the information output from the higher layers.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
short Physical Downlink Control Channel, PDCCH for short TTI (sPDCCH)
Physical Downlink Shared Channel (PDSCH)
short Physical Downlink Shared Channel, PDSCH for short TTI (sPDSCH)
Physical Multicast Channel (PMCH)

The PBCH is used to broadcast a master information block (MIB, Broadcast Channel: BCH) used in common by the terminal apparatuses 1.

The PCFICH is used to transmit the information indicating a region (OFDM symbols) to be used for transmitting the PDCCH.

The PHICH is used to transmit an HARQ indicator (HARQ feedback, the response information) for indicating ACK (ACKnowledgment) or NACK (Negative ACKnowledgment) for uplink data (Uplink Shared Channel:UL-SCH) received by the base station apparatus 3.

The PDCCH, the EPDCCH, and/or the sPDCCH are used to transmit the downlink control information (DCI). In the present embodiment, the PDCCH may include the EPDCCH. Also, the PDCCH may include the sPDCCH.

Here, a plurality of DCI formats may be defined for the downlink control information transmitted on the PDCCH, the EPDCCH, and/or the sPDCCH. Namely, the field for the downlink control information may be defined in a DCI format and mapped to the information bits.

Here, the DCI format for the downlink is also referred to as a downlink DCI, a downlink grant, and/or a downlink assignment. In addition, the DCI format for uplink is also referred to as uplink DCI, uplink grant, and/or uplink assignment. In addition, the DCI grant may include a downlink grant (DL grant) and an uplink grant (UL grant).

The DCI included in the PDCCH and the EPDCCH may include a DL grant for the PDSCH. The DCI included in the sPDCCH may include a DL grant for sPDSCH. Here, the DCI including the DL grant for the sPDSCH may be referred to as sDCI (shortened DCI). Also, the DCI including the UL grant for the sPUSCH may also be referred to as sDCI. Also, in a case that the sPDSCH is placed at the head sTTI in the subframe (the sTTI located in the first half in the subframe from the time domain perspective), the PDCCH may include the sDCI. Also, the EPDCCH may include the sDCI.

Namely, one DL grant may be used for scheduling one PDSCH in one cell. The DL grant may be used for scheduling the PDSCH within the same subframe as the subframe in which the DL grant was transmitted. One DL grant may be used for scheduling one or more sPDSCHs within a cell. The DL grant may be used for scheduling the sPDSCH within the same sTTI as the sTTI (shortened transmission time interval) in which the DL grant was transmitted.

Here, the DL grant may include the information related to downlink allocation for one or more terminal apparatuses 1. Namely, the DL grant may include at least one of the following including, frequency allocation information (Resource allocation), MCS (Modulation and Coding), the number of transmit antenna ports, a Scramble Identity (SCID), the number of layers, a New Data Indicator, a RV (Redundancy Version), the number of transport blocks, precoder information, or a transmission scheme, for one or more terminal apparatus 1.

Note that the subcarrier spacing and/or the symbol length constituting the TTI may be different from the subcarrier spacing and/or the symbol length constituting the sTTI.

In addition, the DCI format used for scheduling one PUSCH in one cell (for example, the DCI format 0 and/or DCI format 4, hereinafter also referred to as the first UL grant, the first UL DCI), may be defined as a UL grant.

For example, the first UL grant may include a Carrier Indicator Field (CIF). In addition, the first UL grant may include the information related to a transmission power command (TPC command: Transmission Power Control Command) for a scheduled PUSCH. In addition, the first UL grant may include the information related to cyclic shift for the DMRS (the DMRS related to transmission of the PUSCH). In addition, the first UL grant may include the information related to the MCS (modulation and coding scheme) and/or the information related to the redundancy version. In addition, the first UL grant may include the information related to resource block assignment and/or the information related to hopping resource allocation. In addition, the first UL grant may include the information used for requesting transmission of CSI (CSI request). In addition, the first UL grant may include the information used for requesting transmission of the SRS (SRS request).

Here, the first UL grant may be defined as DCI common to a plurality of terminal apparatuses 1 and/or DCI dedicated to a certain terminal apparatus 1. Namely, the first UL grant may be transmitted in the common search space and/or the user equipment-specific search space. Also, the first UL grant may be transmitted on the PDCCH and/or the EPDCCH. Also, the CRC parity bit added to the first UL grant may be scrambled with the RNTI which will be described below.

Also, the first UL grant may be used to define the configuration for a single subframe. Namely, the first UL grant may be used to indicate the configuration used in common in one subframe. Namely, the configuration instructed by using the first UL grant may be valid for each subframe. Namely, the first UL grant may be a subframe-specific UL grant. Namely, in a case that the PUSCH is scheduled using the first UL grant, the terminal apparatus 1 may perform transmission on the scheduled PUSCH in a certain subframe (using an entire certain subframe).

Also, as the UL grant, a DCI format at least including the information related to allocation of frequency resources for the PUSCH, the sPUSCH, and/or the sPDCCH (for example, the information related to allocation of a physical resource block for the PUSCH, the sPUSCH, and/or the sPDCCH) may be defined (hereinafter also referred to as a second UL grant or a second UL DCI). Namely, the second UL grant may be used for scheduling at least the PUSCH, the sPUSCH, and/or the sPDCCH.

For example, the second UL grant may include the bandwidth related information for the scheduled PUSCH, the scheduled sPUSCH, and/or the scheduled sPDCCH. Namely, the second UL grant may include the information related to the bandwidth to be scheduled for transmission on the PUSCH, transmission on the sPUSCH, and/or transmission on the sPDCCH.

For example, the second UL grant may include the information related to a start position (and/or an end position, for example, a length from the start position) of the physical resource block for the PUSCH to be scheduled, the sPUSCH to be scheduled, and/or the sPDCCH to be scheduled. In addition, the second UL grant may include the information for indicating a physical resource block for the PUSCH to be scheduled, the sPUSCH to be scheduled, and the sPDCCH to be scheduled.

Here, the second UL grant may include a Carrier Indicator Field (CIF). In addition, the second UL grant may include the information related to a transmission power command (Transmission Power Control Command: TPC command) for the PUSCH to be scheduled. Also, the second UL grant may include the information related to the transmission power command for the sPUSCH to be scheduled. Also, the second UL grant may include the information related to the cyclic shift for the DMRS (DMRS related to transmission of the PUSCH and/or the sPUSCH). In addition, the second UL grant may include the information related to the MCS (modulation and coding scheme) and/or the information related to the redundancy version. In addition, the second UL grant may include the information related to resource block assignment and/or the information related to hopping resource allocation. In addition, the second UL grant may include the information used for requesting transmission of CSI (CSI request). In addition, the second UL grant may include the information used for requesting transmission of the SRS (SRS request).

Here, the information (some or all of the information) transmitted by using the second UL grant may be transmitted by using a higher layer signal (for example, a signal in the MAC layer and/or a signal in the RRC layer). Hereinafter, by using the second UL grant, the transmission of the downlink control information described above will be described, but the downlink control information to be transmitted by using the second UL grant may be transmitted by using the higher layer signal.

Here, the second UL grant may be defined as the common DCI for a plurality of terminal apparatuses 1 (UL grant, Common UL grant, Non-UE specific UL grant). Namely, the second UL grant may be transmitted only in the common search space, which will be described below. Also, the second UL grant may be transmitted only on the PDCCH and/or the EPDCCH.

Also, the CRC parity bit to be added to the second UL grant may be scrambled with the RNTI which will be described below. Here, the CRC parity bit to be added to the second UL grant may be scrambled with the first UL-RNTI. Also, the search space in which the second UL grant is transmitted (for example, common search space) may be provided at least by the first UL-RNTI.

Also, the second UL grant may be used to define configuration for a single subframe. Namely, the second UL grant may be used to indicate configuration used in common in one subframe. Namely, the configuration instructed by using the second UL grant may be valid for one subframe or for each of multiple subframes. Namely, the second UL grant may be a subframe specific UL grant. Namely, in a case that the PUSCH is scheduled by using the second UL grant, the terminal apparatus 1 may perform transmission on the scheduled PUSCH in a certain subframe (using an entire subframe).

Also, as a UL grant, a DCI format that includes the information related to allocation of time resources for at least the PUSCH and/or the sPUSCH may be defined (hereinafter also described as the third UL grant, or the third UL DCI). For example, the third UL grant may include the information related to assignment of transmission time intervals (TTIs) for transmissions on the PUSCH and/or the sPUSCH. Namely, the third UL grant may be used for scheduling at least the PUSCH and/or the sPUSCH.

For example, the third UL grant may include the information related to the length of the transmission time interval for the PUSCH to be scheduled and/or the sPUSCH to be scheduled. Also, the third UL grant may include the information related to the location of the DMRS to be transmitted together with the PUSCH to be scheduled. Also, the third UL grant may include the information related to the location of the DMRS to be transmitted together with the sPUSCH to be scheduled.

Also, the third UL grant may include the information related to the DMRS to be transmitted together with the PUSCH to be scheduled (for example, the information related to the cyclic shift of the DMRS). Also, the third UL grant may include the information related to the DMRS to be transmitted together with the sPUSCH to be scheduled (for example, the information related to the cyclic shift of the DMRS). Also, the third UL grant may include the information on a delay with respect to a transmission on the PUSCH and/or a transmission on the sPUSCH based on the reception (detection) of the third UL grant (Grant to Tx delay offset).

Here, the third UL grant may include a Carrier Indicator Field (CIF). In addition, the third UL grant may include the information related to the transmission power command (Transmission Power Control Command: TPC command) for the PUSCH to be scheduled. Also, the third UL grant may include the information related to the transmission power command for the sPUSCH to be scheduled.

Also, the third UL grant may include the information related to the cyclic shift for the DMRS (the DMRS related to the transmission of the PUSCH and/or the sPUSCH). In addition, the third UL grant may include the information related to the MCS (modulation and coding scheme) and/or the information related to the redundancy version. In addition, the third UL grant may include the information related to the Resource block assignment and/or the information related to the hopping resource allocation. In addition, the third UL grant may include the information used for requesting transmission of CSI (CSI request). In addition, the third UL grant may include the information used for requesting transmission of the SRS (SRS request). In addition, the third UL grant may include the information related to the TTI index which will be described below.

Here, the third UL grant may be defined as the dedicated DCI for one terminal apparatus 1 (UL grant, UE-specific UL grant). Namely, the third UL grant may be transmitted only in the UE-specific space, which will be described below. Also, the third UL grant may be transmitted on the PDCCH, the EPDCCH, and/or the sPDCCH. Also, the third UL grant may be transmitted on the PDSCH.

Also, the CRC parity bit to be added to the third UL grant may be scrambled with the RNTI which will be described below. Here, the CRC parity bit to be added to the third UL grant may be scrambled with the third UL-RNTI. Also, the search space in which the third UL grant is to be transmitted (for example, the user equipment-specific search space) may be provided at least by the second UL-RNTI.

Also, the third UL grant may be used to define configuration for a single transmission time interval. Namely, the third UL grant may be used to indicate the configuration to be used in a single transmission time interval. Namely, the configuration instructed by using the third UL grant may be valid for one transmission time interval. Namely, the second UL grant may be a transmission time interval specific UL grant (a TTI specific UL grant). Namely, in a case that the PUSCH is scheduled using the third UL grant, the terminal apparatus 1 may perform the transmission on the scheduled PUSCH at a certain transmission time interval (at a certain transmission time interval in a certain subframe).

Here, as described above, the second UL grant may be used for scheduling the sPDCCH on which the third UL grant is transmitted. For example, the terminal apparatus 1 may receive (detect) the third UL grant by receiving (detecting) the second UL grant. Further, the terminal apparatus 1 may monitor (decode, detect) the PDCCH, the EPDCCH and/or the sPDCCH on which the third UL grant is transmitted, by monitoring (decoding, detecting) the PDCCH and/or the EPDCCH on which the second UL grant is transmitted.

Here, the PDCCH and/or the EPDCCH on which the second UL grant is transmitted may be detected by the monitoring by the terminal apparatus 1, and the resources of the PDCCH, the EPDCCH and/or the sPDCCH on which the third UL grant is transmitted may be directly indicated by the information included in the second UL grant. Here, the resources of the PDCCH, the EPDCCH and/or the sPDCCH may include a time resource and/or a frequency resource. Namely, the PDCCH, the EPDCCH and/or the sPDCCH on which the third UL grant is transmitted may not be monitored by the terminal apparatus 1.

Hereinafter, the UL grant (DCI format) may include the first UL grant, the second UL grant, and/or the third UL grant.

Here, in a case that the resource of the PDSCH is scheduled by using the downlink assignment, the terminal apparatus 1 may receive the downlink data on the PDSCH based on the scheduling. Further, in a case that resource of the PUSCH is scheduled by using the UL grant, the terminal apparatus 1 may transmit the uplink data and/or the uplink control information by using the PUSCH based on the scheduling. Further, in a case that the resource of the sPUSCH is scheduled by using the UL grant, the terminal apparatus 1 may transmit the uplink data and/or the uplink control information on the sPUSCH based on the scheduling.

In addition, the terminal apparatus 1 may monitor a set of the PDCCH candidates, the EPDCCH candidates, and/or the sPDCCH candidates. Hereinafter, the PDCCH may include the EPDDCH and/or the sPDCCH.

Here, the PDCCH candidate may indicate the candidate that may allow the PDCCH to be placed and/or transmitted by the base station apparatus 3. Furthermore, "to monitor" may imply that the terminal apparatus 1 attempts to decode each PDCCH in a set of the PDCCH candidates in accordance with all of the DCI formats to be monitored.

Here, the set of PDCCH candidates to be monitored by the terminal apparatus 1 is also referred to as a search space. The search space may include a Common Search Space (CSS). For example, the common search space may be defined as a common space for a plurality of terminal apparatuses 1.

Also, the search space may include a user device-specific search space (UE-specific search space: USS). For example, the user device specific search space may be provided at least based on the C-RNTI allocated to the terminal apparatus 1. The terminal apparatus 1 may monitor the PDCCH in the common search space and/or the user device specific search space and detect the PDCCH addressed to its own apparatus.

Also, for the transmission of the downlink control information (transmission on the PDCCH), the RNTI which the base station apparatus 3 assigned to the terminal apparatus 1 may be used. More specifically, a CRC (cyclic redundancy check) parity bit may be added to the DCI format (which may be the downlink control information), and after being added, the CRC parity bit may be scrambled with the RNTI. Here, the CRC parity bit attached to the DCI format may be obtained from a payload of the DCI format.

Here, according to the present embodiment, "CRC parity bit", "CRC bit", and "CRC" may be the same. In addition, "the PDCCH on which the DCI format to which the CRC parity bit is added is transmitted", "the PDCCH that includes the CRC parity bit and also includes the DCI format", and "the PDCCH that includes the CRC parity bit", and "the PDCCH that includes the DCI format" may be the same. Also, "the PDCCH that includes X" and "the PDCCH that accompanies X" may be the same. The terminal apparatus 1 may monitor the DCI format. Further, the terminal apparatus 1 may monitor the DCI. Further, the terminal apparatus 1 may monitor the PDCCH.

The terminal apparatus 1 attempts to decode the DCI format to which the CRC parity bit scrambled with the RNTI is added, and detects, as a DCI format addressed to its own apparatus, the DCI format for which the CRC has succeeded (also referred to as blind decoding). Namely, the terminal apparatus 1 may detect the PDCCH that is accompanied by the CRC scrambled with the RNTI. In addition, the terminal apparatus 1 may detect the PDCCH that is accompanied by the DCI format to which the CRC parity bit scrambled with the RNTI is added.

Here, the RNTI may include a C-RNTI (Cell-Radio Network Temporary Identifier). For example, the C-RNTI may be a unique identifier for the terminal 1, which is used for identifying the RRC connection and the scheduling. Further, the C-RNTI may be used for unicast transmission that is dynamically scheduled.

The RNTI may further include a Semi-Persistent Scheduling C-RNTI (SPS C-RNTI). For example, the SPS C-RNTI is a unique identifier, used for semi-persistent scheduling, for the terminal 1. In addition, the SPS C-RNTI may also be used for unicast transmission that is semi-persistently scheduled. Here, the semi-persistently scheduled transmission may include the meaning of a periodically scheduled transmission.

Further, the RNTI may include a Random Access RNTI (RA-RNTI). For example, the RA-RNTI may be an identifier used for transmitting a random access response message. Namely, the RA-RNTI may be used for the transmission of the random access response message in the random access procedure. For example, in a case of transmitting the random access preamble, the terminal apparatus 1 may monitor the PDCCH that is accompanied by the CRC scrambled with the RA-RNTI. Further, the terminal apparatus 1 may receive the random access response on the PDSCH, based on the detection of the PDCCH that is accompanied by the CRC scrambled with the RA-RNTI.

Here, the PDCCH that is accompanied by the CRC scrambled with the C-RNTI may be transmitted in the USS or the CSS. In addition, the PDCCH that is accompanied by the CRC scrambled with the SPS C-RNTI may be transmitted in the USS or CSS. The PDCCH that is accompanied by the CRC scrambled with the RA-RNTI may be transmitted only in the CSS.

The PDSCH is used to transmit downlink data (downlink shared channel: DL-SCH). The PDSCH is used to transmit a system information message. Here, the system information message may be the cell-specific information (the information unique to a cell). Also, the system information may be included in the RRC signaling. Also, the PDSCH may be used to transmit RRC signaling and a MAC control element.

Also, the PDSCH may be used to transmit the third UL grant. For example, the terminal apparatus 1 may receive (detect) the third UL grant (the information included in the third UL grant) on the PDSCH scheduled by the base station apparatus 3.

The PMCH is used to transmit multicast data (multicast channel (MCH)).

In FIG. 1, the following downlink physical signals are used for downlink radio communication. Here, the downlink physical signal is not used to transmit the information output from the higher layer but is used by the physical layer.

Synchronization signal (SS)

Downlink reference signal (DL RS)

The synchronization signal is used by the terminal apparatus 1 to take synchronization in the downlink in the frequency domain and in the time domain. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus 1 to perform the channel compensation of the downlink physical channel. Here, the downlink reference signal is used for the terminal apparatus 1 to calculate the downlink channel state information.

According to the present embodiment, the following five types of downlink reference signals are used.

Cell-specific Reference Signal (CRS)

UE-specific Reference Signal (URS) related to the PDSCH

Demodulation Reference Signal (DMRS) related to the EPDCCH

Non-Zero Power Channel State Information-Reference Signal (NZP CSI-RS)

Zero Power Chanel State Information-Reference Signal (ZP CSI-RS)

Multimedia Broadcast and Multicast Service over Single Frequency Network Reference Signal (MBSFN RS)

Positioning reference signal (PRS)

Here, the downlink physical channel and the downlink physical signal are also collectively referred to as a downlink signal. The uplink physical channel and the uplink physical signal are collectively also referred to as an uplink signal. The downlink physical channel and the uplink physical channel are collectively also referred to as a physical channel. The downlink physical signal and the uplink physical signal are collectively also referred to as a physical signal.

BCH, MCH, UL-SCH and DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

Figure 2:
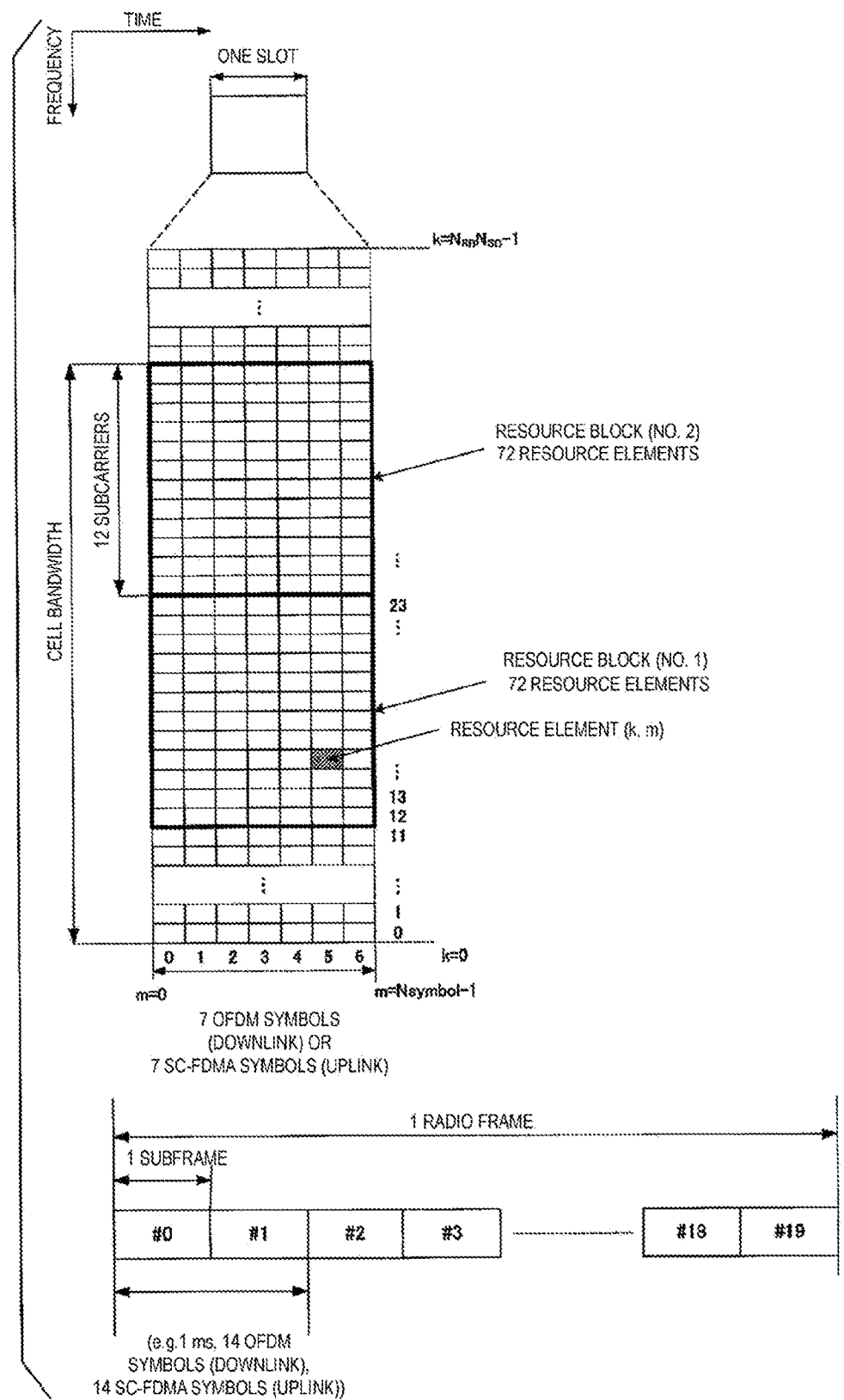
FIG. 2 is a diagram illustrating a configuration of radio resources according to the present embodiment.

FIG. 2 is a diagram illustrating the configuration of the slot according to the present embodiment. Here, a normal Cyclic Prefix (CP) may be applied to an OFDM symbol. In addition, an extended Cyclic Prefix (CP) may be applied to the OFDM symbol. Also, physical signals or physical channels transmitted in each of the slots may be represented by a resource grid.

Here, in the downlink, the resource grid may be defined by multiple subcarriers and multiple OFDM symbols. In the uplink, the resource grid may be defined by multiple subcarriers and multiple SC-FDMA symbols. Also, each of the elements in the resource grid is referred to as a resource element.

Here, the resource element may be represented by a frequency-domain index (k) and a time-domain index (m). Namely, the resource element may be identified by using the subcarrier number (frequency domain index: k) and the number of the OFDM symbol or SC-FDMA symbol (time domain index: m).

Namely, in a case that the size of the resource block in the frequency domain expressed as the number of subcarriers in the downlink is $N_{sc}$ and the configuration of the downlink bandwidth expressed as a multiple of $N_{sc}$ is $N_{RB}$, the number of subcarriers may be indicated as k=0, . . . , $N_{RB}N_{SC}$−1. Further, in a case that the size of the resource block in the frequency domain expressed as the number of subcarriers in the uplink is $N_{sc}$ and the configuration of the uplink bandwidth expressed as a multiple of $N_{sc}$ is $N_{RB}$, the number of subcarriers may be indicated as k=0, . . . , $N_{RB}N_{SC}$−1.

Also, in a case that the number of the OFDM symbol in one downlink slot is indicated as $N_{symbol}$, the number of the OFDM symbol may be indicated as m=$N_{symbol}$−1. Also, in a case that the number of the SC-FDMA symbol in one uplink slot is indicated as $N_{symbol}$, the number of the SC-FDMA symbol may be indicated as m=0, . . . , $N_{symbol}$−1.

Here, a resource block may be used to express mapping of a certain physical channel (the PDSCH, the PUSCH, or the like) to resource elements. Also, one physical resource block may be defined by seven consecutive OFDM symbols or SC-FDMA symbols in the time domain and twelve contiguous sub-carriers in the frequency domain. Thus, one physical resource block may include (7×12) resource elements. In addition, one physical resource block may correspond to one slot in the time domain, and may correspond to 180 kHz in the frequency domain in a case that the subcarrier interval Δf is 15 kHz. Subcarrier interval Δf may be different for each channel and/or for each TTI/s TTI.

Also, one radio frame may include 20 slots numbered from #0 to #19. For example, one radio frame may be 10 ms. Also, one subframe may include two consecutive slots. For example, one subframe may be 1 ms and subframe n may include slot 2n and slot 2n+1. Namely, one subframe in the downlink may be 1 ms and may include 14 OFDM symbols. Further, one subframe in the uplink may be 1 ms and may include 14 SC-FDMA symbols.

For example, in the downlink, one subframe may include 14 OFDM symbols. In the downlink, one slot may include 7 OFDM symbols. Further, in the uplink, one subframe may include 14 SC-FDMA symbols. In the uplink, one slot may include 14 SC-FDMA symbols.

Here, a transmission time interval (TTI) may be defined for transmission in the downlink and/or transmission in the uplink. Namely, transmission in the downlink and/or transmission in the uplink may be performed in one transmission time interval (the length of one transmission time interval).

For example, in the downlink, transmission time intervals of 1, 2, 3, 4, 5, 6, 7, 8, 9, 10, 11, 12, 13 and/or 14 (one subframe) may be defined. Namely, in the downlink, the length of the transmission time interval may be 1, 2, 3, 4, 5, 6, 7, 8, 9, 10, 11, 12, 13, and/or 14 (one subframe) OFDM symbols. A transmission time interval including fewer than 14 OFDM symbols is also referred to as sTTI.

Also, in the uplink, transmission time intervals of 1, 2, 3, 4, 5, 6, 7, 8, 9, 10, 11, 12, 13, and/or 14 (one subframe) may be defined. Namely, in the uplink, the length of the transmission time interval may be 1, 2, 3, 4, 5, 6, 7, 8, 9, 10, 11, 12, 13, and/or 14 (one subframe) SC-FDMA symbols. A transmission time interval including fewer than 14 OFDM symbols is also referred to as sTTI.

Hereinafter, carrier aggregation will be described.

Here, one or more serving cells may be configured for the terminal apparatus 1. A technology with which the terminal apparatus 1 communicates via multiple serving cells is referred to as cell aggregation or carrier aggregation.

Also, one or more serving cells to be configured may include one primary cell and one or more secondary cells. The primary cell may be a serving cell in which an initial connection establishment procedure has been performed, a serving cell in which a connection re-establishment procedure has been started, or a cell indicated as the primary cell in a handover procedure. Further, the primary cell may be a cell used for transmission of the PUCCH. Here, a secondary cell may be configured at a point of time when an RRC connection is established or later.

In the downlink, a carrier corresponding to a serving cell is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 may perform transmission and/or reception simultaneously on a plurality of physical channels in one or more serving cells (component carriers). Here, transmission of one physical channel may be performed in one serving cell (component carrier) out of the multiple serving cells (component carriers).

Here, the base station apparatus 3 may configure one or more serving cells by using a signal of a higher layer (for example, RRC signaling). For example, one or more secondary cells may be configured so as to form a set of multiple serving cells with a primary cell.

The base station apparatus 3 may activate or deactivate one or more serving cells by using higher layer signaling (for example, a MAC control element). For example, the base station apparatus 3 may activate or deactivate one serving cell configured by using RRC signaling, or one or more serving cells of multiple serving cells configured by using RRC signaling. Here, the terminal apparatus 1 may transmit CSI (for example, aperiodic CSI) only to the activated serving cell.

In addition, linking may be defined between an uplink (for example, uplink component carrier) and a downlink (for example, downlink component carrier). Namely, the serving cell for the UL grant (the serving cell on which transmission (uplink transmission) of the (s)PUSCH scheduled with the UL grant is performed) may be identified based on the linking between the uplink and the downlink. Here, in this case, there is no carrier indicator field in the downlink assignment or in the UL grant.

Namely, the downlink assignment received in the primary cell may correspond to downlink transmission in the primary cell. Also, the UL grant received in the primary cell may correspond to uplink transmission in the primary cell. Further, the downlink assignment received in a certain secondary cell may correspond to the downlink transmission in the certain secondary cell. Also, the UL grant received in a certain secondary cell may correspond to the uplink transmission in the certain secondary cell.

Figure 3:
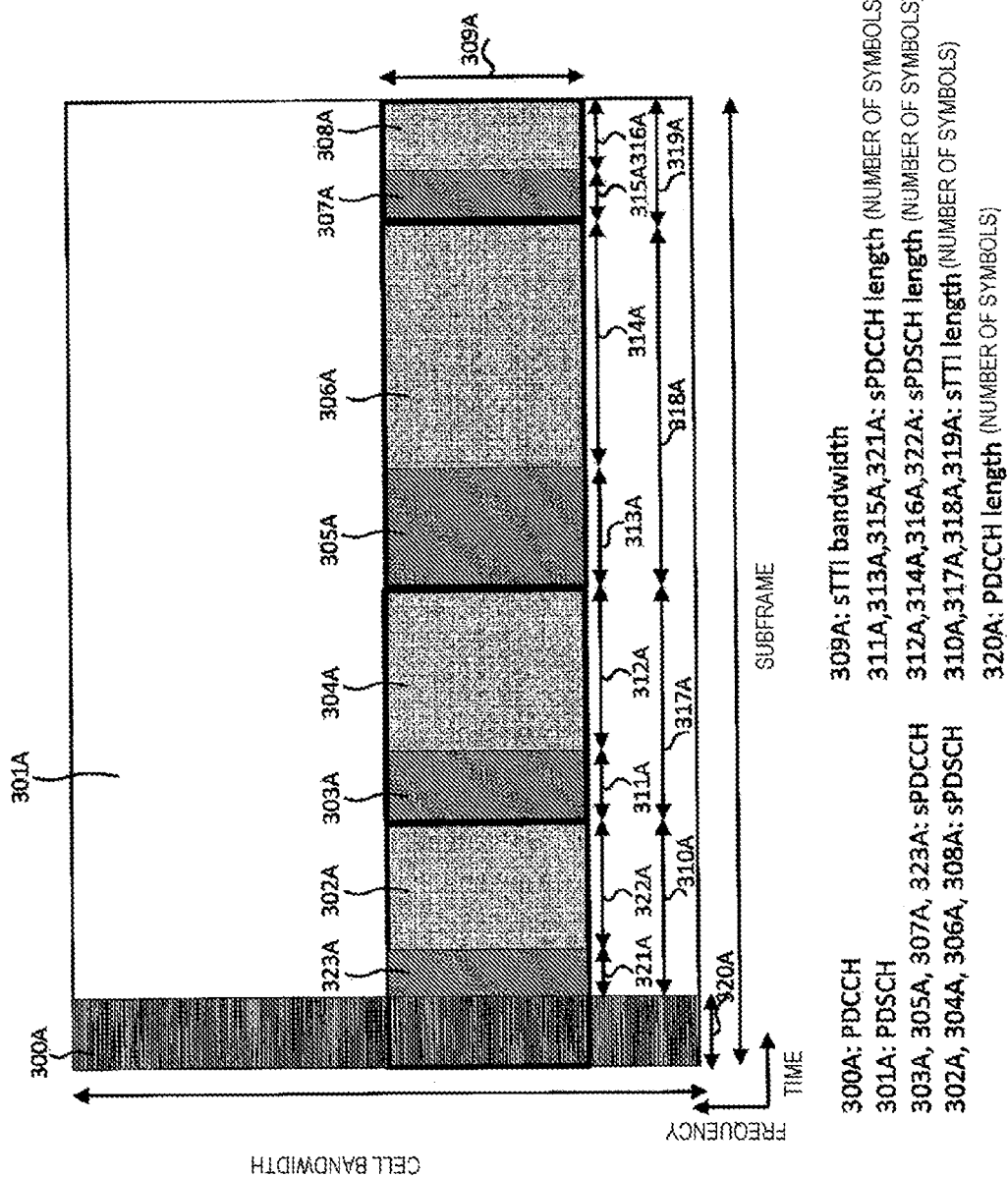
FIG. 3 is a diagram illustrating an example of physical channel allocation in downlink according to the present embodiment.

FIG. 3 is a diagram illustrating an example of allocation of physical channels in the downlink according to the present embodiment. The PDCCH 300A includes one or more OFDM symbols from the beginning of the subframe (PDCCH length 320A), and is transmitted by using a bandwidth equal to the cell bandwidth. The PDSCH 301A includes the remaining OFDM symbols of the entire subframe with the OFDM symbols of the PDCCH 300A being excluded, and is transmitted by using a part of the cell bandwidth. The sPDCCHs 323A, 303A, 305A, and 307A may include a part of the remaining OFDM symbols of the entire subframe with the OFDM symbols of the PDCCH300A being excluded (the sPDCCH lengths 321A, 311A, 313A and 315A), and may be transmitted by using the sTTI bandwidth 309A. The sPDSCHs 302A, 304A, 306A, and 308A may include a part of the remaining OFDM symbols of the entire subframe with the OFDM symbols of the PDCCH300A being excluded (the sPDSCH lengths 322A, 312A, 314A and 316A), and may be transmitted by using the sTTI bandwidth 309A.

Here, the sPDCCHs 323A, 303A, 305A and 307A, and/or the sPDSCH 302A, 304A, 306A and 308A may also be transmitted by using at least one bandwidth or a part of the cell bandwidth.

The length 310A of the sTTI includes the length 321A of the sPDCCH and the length 322A of the sPDSCH. The length 317A of the sTTI includes the length 311A of the sPDCCH and the length 312A of the sPDSCH. The length 318A of the sTTI includes the length 313A of the sPDCCH and the length 314A of the sPDSCH. The length 319A of the sTTI includes the length 315A of the sPDCCH and the length 316A of the sPDSCH. The sTTI lengths 310A to 319A may be common values in the subframe. The sTTI lengths 310A to 319A may be different within the subframe.

Note that some of sPDCCHs 323A, 303A, 305A and 307A may be the sPDSCH. In this case, the length of the sPDSCH may be the same as the length of the sTTI.

Also, the sPDCCH 323A being allocated after the PDCCH 300A and closest to the PDCCH 300A for the sTTI 310A may be included in the PDCCH 300A. Namely, the transmission on the sPDCCH 323A may be performed by using the PDCCH 300A. Namely, the DL grant for the sPDSCH 302A may be transmitted by using the PDCCH 300A. At this time, the length 310A of the sTTI may include only the length 322A of the sPDSCH 302A.

Based on FIG. 3, the base station apparatus 3 may schedule the PDSCH, or may schedule the sPDSCH, to the terminal apparatus 1. Here, in the following description, the transmission mode using the transmission time interval TTI is also referred to as the transmission mode (TTI mode) for the PDSCH. The transmission mode using the short transmission time interval sTTI is also referred to as the transmission mode (sTTI mode) for the sPDSCH.

Hereinafter, the transmission mode according to the present embodiment will be described.

The transmission mode of the terminal apparatus 1 is configured by parameters of the higher layer. Namely, the base station apparatus 3 transmits the Transmission Mode information to the terminal apparatus 1 by RRC signaling. Specifically, the base station apparatus 3 may transmit the Common configuration information or the Independent configuration information as the transmission mode (TM) information. The transmission mode information indicates the transmission mode. The common configuration information is the configuration information configured in common for the PDSCH and the sPDSCH. The common configuration information indicates a common transmission mode for the sPDSCH and the PDSCH. The independent configuration information for the PDSCH indicates the transmission mode for the PDSCH. The independent configuration information for the sPDSCH indicates the transmission mode for the sPDSCH.

In a case that the common configuration information is transmitted (notified, instructed) as the transmission mode information from the base station apparatus 3 by the RRC signaling, the terminal apparatus 1 assumes the use of the same transmission mode for the TTI mode (the transmission mode for the PDSCH) and the sTTI mode (the transmission mode for the sPDSCH) based on the common configuration information.

For example, in a case that the common configuration information received from the base station apparatus 3 indicates TM3, the terminal apparatus 1 determines that the TTI mode is the transmission mode TM3 and determines that the sTTI mode is the transmission mode TM3.

The independent configuration information is the configuration information that is configured independently (flexibly, independently) for each of the PDSCH and the sPDSCH. For example, in a case that the common configuration information for the PDSCH indicates the transmission mode 4, the terminal apparatus 1 determines that the transmission mode for the TTI mode is TM4. For example, in a case that the common configuration information for the sPDSCH indicates the transmission mode 3, the terminal apparatus 1 determines that the transmission mode for the sTTI mode is TM3.

The transmission mode may be configured by the DCI format of the DCI transmitted on the PDCCH or the sPDCCH (TM independent DCI format, TM-dependent DCI format, and the like). Namely, the terminal apparatus 1 selects the DCI format based on the transmission mode, and attempts to receive the selected DCI format.

The terminal apparatus 1 determines TTI mode (transmission mode for the PDSCH) and sTTI mode (transmission mode for the sPDSCH) based on at least one of the multiple kinds of configuration information including the common configuration information, the independent configuration information, and the like.

Hereinafter, the CSI report mode according to the present embodiment will be described.

The CSI reporting mode includes aperiodic CSI reporting mode and periodic CSI reporting mode.

For example, the base station apparatus 3 may configure the reporting mode by using a signal of a higher layer (for example, RRC signaling). Namely, any one of the mode 1-0, the mode 1-1, the mode 1-2, the mode 2-0, the mode 2-2, the mode 3-0, the mode 3-1, and the mode 3-2 may be configured, as the aperiodic CSI reporting mode. Further, as the periodic CSI reporting mode, any one of the mode 1-0, the mode 1-1, the mode 2-0, and the mode 2-1 may be configured.

The CSI reporting mode may be defined by a combination of a CQI feedback type and a PMI feedback type. Mode X-Y indicates a combination of CQI feedback type X and PMI feedback type Y.

The terminal apparatus 1 may perform aperiodic CSI reporting (transmission) by using the PUSCH in a certain subframe, based on the reporting mode (namely, the feedback type of CQI and PMI). Further, the terminal apparatus 1 may perform aperiodic CSI reporting (transmission) by using the sPUSCH at a certain transmission time interval based on the reporting mode. Further, the terminal apparatus 1 may perform periodic CSI reporting (transmission) by using the PUCCH in a certain subframe based on the reporting mode. Further, the terminal apparatus 1 may perform periodic CSI reporting (transmission) by using the sPUCCH at a certain transmission time interval based on the reporting mode.

For example, in a case that the aperiodic CSI reporting mode is configured and the mode 1-0 is configured, only a single wideband CQI may be reported in a certain subframe. Also, in a case that the mode 1-2 is configured, a single wideband CQI and a plurality of PMIs (subband PMIs) may be reported in a certain subframe.

In addition, in a case that the mode 2-0 is configured, a single CQI and a single wideband CQI related to the subband selected by the terminal apparatus 1 may be reported in a certain subframe. In addition, in a case that the mode 2-2 is configured, a single CQI, and a plurality of PMIs (subband PMIs), and, a single wideband CQI, and a single PMI, related to the subband selected by the terminal apparatus 1, may be reported in a certain subframe.

In addition, in a case that the mode 3-0 is configured, a plurality of CQIs (subband CQIs) and a single wideband CQI related to the subband configured by the base station apparatus 3 may be reported in a certain subframe. In a case that the mode 3-1 is configured, a plurality of CQIs (subband CQIs), a single wideband CQI, and a single PMI, related to the subband configured by the base station apparatus 3, may be reported in a certain subframe. In a case that the mode 3-2 is configured, a plurality of CQIs (subband CQIs), a single wideband CQI, and a plurality of PMIs (subband PMIs), related to the subband configured by the base station apparatus 3, may be reported in a certain subframe.

Hereinafter, the subband CQI may include the CQI related to the subband selected by the terminal apparatus 1, the CQI related to the subband configured by the base station apparatus 3, and the CQI related to each of all subbands included in the downlink bandwidth of the cell, as well as the CQI related to each of all subbands included in the bandwidth of the sTTI band.

Further, the wideband bandwidth defined for the CSI reporting mode for the TTI mode, and the wideband bandwidth defined for the CSI reporting mode for the sTTI mode may be configured in common or may be configured differently. For example, the base station apparatus 3 may transmit the information used for configuring (determining) the respective wideband bandwidths. For example, the wideband bandwidth defined for the CSI reporting mode for the TTI mode may be the entire downlink bandwidth of the cell. For example, the base station apparatus 3 may transmit the information used to configure (determine) the wideband bandwidth defined for the CSI reporting mode for the sTTI mode. Also, for example, the wideband bandwidth defined for the CSI reporting mode for the sTTI mode may be the bandwidth of the sTTI band allocated to the terminal apparatus 1.

Also, the subband bandwidth defined for the CSI reporting mode for the TTI mode and the subband bandwidth defined for the CSI reporting mode for the sTTI mode may be configured in common or configured differently. The subband bandwidth defined for the CSI reporting mode for the TTI mode may be given based on the downlink bandwidth of the cell. The subband bandwidth defined for the CSI reporting mode for the sTTI mode may be given based on the bandwidth of the sTTI band. Here, the subband may include the subband selected by the terminal apparatus 1, the subband configured by the base station apparatus 3, all the subbands included in the downlink bandwidth of the cell, and all the subbands included in the bandwidth of the sTTI band.

The CSI reporting according to the present embodiment may include aperiodic CSI reporting and periodic CSI reporting. Transmission of the aperiodic CSI reporting may be triggered by UL grant or DL grant. Here, the field mapped to the information used for requesting the transmission of the CSI (CSI request) is also referred to as the CSI request field. As described above, the CSI request field may be included in the UL grant. Also, the CSI request field may be included in the DL grant. The UL grant including the CSI request field may be the first UL grant. Also, the UL grant including the CSI request field may be the second UL grant. Also, the UL grant including the CSI request field may be the third UL grant. Hereinafter, a case that the CSI request field is included in the first UL grant and the third UL grant will be described. However, the CSI request field included in the third UL grant may be replaced with the CSI request field included in the second UL grant.

In periodic CSI reporting, the terminal apparatus 1 periodically transmits the CSI. The information on the PUCCH/sPUCCH resources used to transmit periodic CSI reporting, and/or the information for configuring the interval (cycle), may be notified by a higher layer signal (for example, RRC signaling).

The following is aspect A according to the present embodiment. Aspect A is an example of determining content of CSI.

Figure 4:
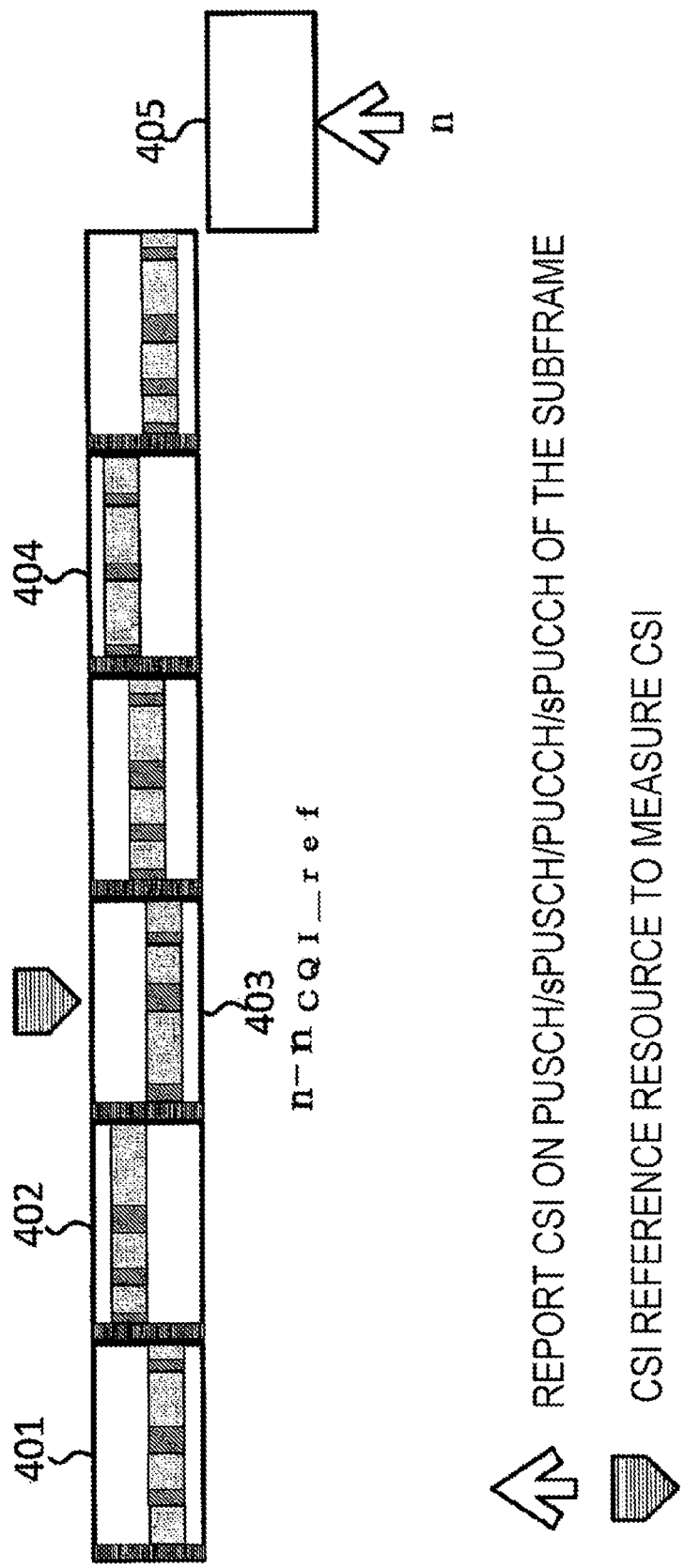
FIG. 4 is a diagram illustrating an example of determining CSI content in aspect A of the present embodiment.

FIG. 4 is a diagram illustrating an example of determining CSI content in aspect A of the present embodiment. The CSI content is the means by which the terminal apparatus 1 informs the status of quality of the downlink physical channel to the base station apparatus 3. The base station apparatus 3 may schedule, based on the received CSI content, downlink data to the terminal apparatus 1 in a frequency band with good channel quality. The content of CSI may include some or all of CQI, PMI and RI. The content of CSI may be indicated by CSI reporting mode. Namely, different CSI reporting modes may include different CSI content. Note that the CSI content may be specified in advance from the base station apparatus 3 by RRC signaling. The content of CSI is also referred to as reporting type, or feedback type.

In FIG. 4, the terminal apparatus 1 may perform CSI reporting on the subframe n (405). The terminal apparatus 1 may perform a measurement for deriving the CSI in a subframe n-$n_{CQI\_ref}$ (403) which is referred to as a CSI reference resource. The measurement for deriving CSI may include measurement of channels and measurement of interference.

The following describes the CSI reference resource according to the present embodiment. The terminal apparatus 1 derives CSI by assuming transmission of the PDSCH/sPDSCH in the CSI reference resource.

In the frequency domain, the CSI reference resource may be defined by a group of downlink physical resource blocks corresponding to the frequency band for which the CQI value is derived. For example, in a case that the terminal apparatus 1 measures the wideband CQI, the frequency domain of the CSI reference resource may correspond to the entire downlink system bandwidth including all the physical resource blocks. Further, in a case that the terminal apparatus 1 measures the subband CQI configured by the base station apparatus 3, the frequency domain of the CSI reference resource may correspond to the downlink bandwidth configured by the base station apparatus 3. Namely, the terminal apparatus 1 may perform measurement for deriving the CSI in a group of physical resource blocks related to the frequency bandwidth corresponding to the CSI reference resource.

In the time domain, the CSI reference resource may be defined by a downlink subframe or a special subframe n-$n_{CQI\_ref}$.

For example, the $n_{CQI\_ref}$ value for periodic CSI reporting is the value such that the subframe n-$n_{CQI\_ref}$ corresponds to a valid downlink subframe or valid special subframe that precedes the subframe n by four or more subframes.

Also, in a case that aperiodic CSI reporting (transmission) is triggered by UL grant, the CSI reference resource for aperiodic CSI reporting can be a valid downlink subframe or a valid special subframe including UL grant for triggering aperiodic CSI report.

In addition, in a case that the aperiodic CSI report (transmission) is triggered by Random Access Response Grant (RAR), the CSI reference resource for aperiodic CSI reporting is a valid downlink subframe or a valid special subframe n-$n_{CQI\_ref}$, following the subframe that received the RAR grant. Here, $n_{CQI\_ref}$ may be a value of 4.

The mobile station apparatus 1 regards a subframe that satisfies at least the following conditions (X1) to (X3) as valid. Note that the downlink subframe in the condition (X1) may include a special subframe.

Condition (X1): A subframe is indicated as a downlink subframe by the uplink-downlink configuration of the serving cell.

Condition (X2): In a case that a subframe is not TM9 or TM10, the subframe is not an MBSFN subframe.

Condition (X3): The subframe is not included in the configured measurement gap.

In addition, in a case that there is neither valid downlink subframe nor valid special subframe n-$n_{CQI\_ref}$ corresponding to the uplink subframe n in a certain serving cell, the CSI reporting in the uplink subframe n of the certain serving cell may be omitted.

The CSI reference resource in the time domain may include a part of the entire number of symbols or the entire number of symbols in the subframe. For example, the terminal apparatus 1 in the sTTI mode may measure the CSI based on the length of the sTTI. For example, the terminal apparatus 1 in the sTTI mode may determine the number of OFDM symbols constituting the CSI reference resource based on the length of the sTTI. Further, the $n_{CQI\_ref}$ value of the CSI reference resource may be configured in advance from the base station apparatus 3. Namely, the $n_{CQI\_ref}$ value of the CSI reference resource may be configured based on the parameters received from the base station apparatus 3. For example, the parameters may be related to (may indicate), the downlink sTTI length, the sPDSCH length, the sPDCCH length, the uplink sTTI length, the sPUSCH length, and/or the sPUCCH length. For example, the parameter directly indicates the $n_{CQI\_ref}$ value.

In the region of the layer, the CSI reference resource may be defined by RI and PMI.

As described above, the CSI reference resource is a subframe that performs CSI measurement. The terminal apparatus 1 performs measurement for deriving the CSI based on the reference signal such as the CRS or CSI-RS in the determined CSI reference resource. In performing measurement for deriving the CSI in the CSI reference resource, the terminal apparatus 1 assumes a transmission scheme for the PDSCH/sPDSCH according to the configured transmission mode. The transmission scheme for the PDSCH is given based on the TTI mode. The transmission scheme for the sPDSCH is given based on the sTTI mode. The transmission scheme may include MIMO Spatial Multiplexing and Transmit Diversity.

The terminal apparatus 1 may determine transmission of the RI, based on the assumed transmission scheme for the PSDCH/sPDSCH and the information on the antenna port. Further, the terminal apparatus 1 may select the optimum PMI based on the determined RI. In calculating the CQI, the terminal apparatus 1 derives the maximum CQI index whereby error rate of the transport block, specified by the modulation scheme according to the CQI index and the transport block size, does not exceed 0.1. In a case that feedback of RI and/or feedback of PMI are performed, the terminal apparatus 1 assumes that downlink data has been transmitted by the RI and the PMI, and calculates the CQI.

As described above, the terminal apparatus 1 derives the CSI according to the transmission scheme. Namely, the terminal apparatus 1 needs to determine which of the transmission scheme for the PDSCH and the transmission scheme for the sPDSCH the CSI feedback corresponds to. The contents of CSI reported for different transmission schemes are different. In FIG. 4, in a case that a downlink physical channel for the terminal apparatus 1 is allocated in the downlink subframe 403 defined in the CSI reference resource, the CSI content and the transmission scheme assumed for deriving CSI may be determined based on the type of the allocated downlink physical channel. Here, the type of downlink physical channel may include the PDSCH and the sPDSCH. In a case that the downlink physical channel for the terminal apparatus 1 has not been allocated in the downlink subframe 403 defined in the CSI reference resource, the CSI content and the transmission scheme assumed for deriving CSI may be determined based on the type of the downlink physical channel allocated for the terminal apparatus 1 before and closest to the CSI reference resource.

For example, as illustrated in FIG. 4, the terminal apparatus 1 performs CSI reporting in the uplink subframe n (405). The downlink subframe 403, namely, the downlink subframe $n-n_{CQI\_ref}$ may be a CSI reference resource corresponding to the uplink subframe n. The terminal apparatus 1 performs measurement for deriving CSI in the downlink subframe 403. In a case that the PDSCH is allocated in the downlink subframe 403, the terminal apparatus 1 may determine the contents of the CSI corresponding to the transmission scheme for the PDSCH and perform the measurement for deriving CSI. Also, in a case that the sPDSCH is allocated in the downlink subframe 403, the terminal apparatus 1 may determine the contents of the CSI corresponding to the transmission scheme for the sPDSCH and perform the measurement for deriving CSI. In the downlink subframe 403, the PDSCH and the sPDSCH for the terminal apparatus 1 may not be allocated. In such a condition, in a case that there is a subframe to which the PDSCH or the sPDSCH is allocated before and closest to the subframe 403, the CSI content and the transmission scheme assumed for deriving CSI may be determined based on the PDSCH or the sPDSCH allocated to the subframe. Based on the determined content of the CSI, the terminal apparatus 1 may perform measurement for deriving CSI in the subframe 403 which is a CSI reference resource.

As described above, the content of CSI may include some or all of the CQI, the PMI and the RI. Also, the content of CSI may be determined by a transmission scheme for the PDSCH or the sPDSCH. For example, the transmission scheme for the PDSCH is MIMO spatial multiplexing (Spatial Multiplexing), and the transmission scheme for the sPDSCH is transmission diversity (Transmit Diversity). In a case that the downlink physical channel allocated to the CSI reference resource or before and closest to the CSI reference resource is the PDSCH, the terminal apparatus 1 may feed back (report) the content of the CSI related to the scheduling of the MIMO spatial multiplexing to the base station apparatus 3. Further, in a case that the downlink physical channel allocated to the CSI reference resource or before and closest to the CSI reference resource is the sPDSCH, the terminal apparatus 1 may feed back (report) the content of the CSI related to the scheduling of the transmission diversity to the base station apparatus 3. Note that, the contents of the CSI corresponding to the transmission scheme for the PDSCH and the sPDSCH may be configured in advance by the base station apparatus 3.

The following is aspect B according to the present embodiment. Aspect B is another example of determining content of CSI.

As mentioned above, aperiodic CSI reporting may be triggered by a UL grant including a CSI request field. The terminal apparatus 1 may determine the content of the CSI based on the type of the downlink physical channel that includes the UL grant including the CSI request field set to trigger the transmission of the CSI. Here, the type of the downlink physical channel in aspect B of the present embodiment may include the PDCCH and the sPDCCH.

For example, in a case that the UL grant that triggers aperiodic CSI reporting is included in the PDCCH, the terminal apparatus 1 may determine the CSI content according to the TTI mode (the transmission scheme for the PDSCH), and perform measurement to derive CSI in the CSI reference resource.

Further, for example, in a case that the UL grant that triggers aperiodic CSI reporting is included in the sPDCCH, the terminal apparatus 1 may determine the CSI content according to the sTTI mode (the transmission scheme for the sPDSCH), and perform measurement to derive CSI in the CSI reference resource.

The following is aspect C according to the present embodiment. Aspect C is another example of determining content of CSI.

As described above, in the measurement for deriving CSI in the CSI reference resource, the terminal apparatus 1 needs to determine which of the transmission scheme for the PDSCH or the transmission scheme for the sPDSCH the CSI feedback corresponds to.

The terminal apparatus 1 may determine the CSI content and a transmission scheme assumed for deriving CSI, based on the transmission scheme of the PDSCH or the sPDSCH indicated in the detected downlink DCI format (DL grant). Here, the transmission scheme assumed for deriving CSI may be a transmission scheme of the PDSCH or the sPDSCH indicated in the downlink DCI format (DL grant).

Also, DL grant may trigger CSI reporting. Namely, the terminal apparatus 1 may receive a DL grant including a CSI request field set to trigger transmission of CSI, the DL grant being used for scheduling the downlink physical channel (PDSCH, sPDSCH), and determine the CSI content and the transmission scheme assumed for deriving the CSI based on the transmission scheme of the downlink physical channel (PDSCH, sPDSCH) indicated in the received DL grant.

For example, in a case that a DL grant is detected in a downlink subframe defined in the CSI reference resource, the terminal apparatus 1 may determine content of CSI and the transmission scheme assumed for deriving CSI based on the transmission scheme of the PDSCH or the sPDSCH indicated by the detected DL grant. Further, in a case that DL grant has not been detected in the downlink subframe defined in the CSI reference resource, the terminal apparatus 1 may determine the CSI content and the transmission scheme assumed for deriving the CSI, and perform measurement for deriving the CSI, based on the transmission scheme of the PDSCH or the sPDSCH indicated by the DL grant detected before and closest to the CSI reference resource.

For example, in a case that the transmission scheme of the PDSCH or the sPDSCH indicated in the DL grant detected in the CSI reference resource is MIMO spatial multiplexing, the terminal apparatus 1 may determine the content of the CSI corresponding to the MIMO spatial multiplexing, and perform measurement for deriving the CSI.

Further, in a case that the transmission scheme of the PDSCH or the sPDSCH indicated in the DL grant detected in the CSI reference resource is transmission diversity, the terminal apparatus 1 may determine the content of the CSI corresponding to the transmission diversity, and perform measurement for deriving the CSI.

Content of CSI corresponding to MIMO spatial multiplexing or transmission diversity may be configured in advance by higher layer signaling. In addition, the contents of CSI corresponding to MIMO spatial multiplexing or transmission diversity may be determined based on a CSI reporting mode that is configured in the terminal apparatus 1 and capable of supporting MIMO spatial multiplexing or transmission diversity.

The PUSCH, the PUCCH, the sPUSCH or the sPUCCH resources used for CSI reporting (transmission of CSI) may be allocated in advance by RRC signaling from the base station apparatus 3. The resources used for CSI reporting may be linked with the resources of the DL grant and/or the resources of the associated DL data (the PDSCH, the sPDSCH).

Aspect D according to the present embodiment will be described below. Aspect D is another example of determining content of CSI.

Content of CSI may be designated by the CSI reporting mode notified by the higher layer. The base station apparatus 3 transmits the CSI report mode to the terminal apparatus 1 by RRC signaling. Specifically, the base station apparatus 3 may transmit the aperiodic CSI reporting parameter (cqi-ReportModeAperiodic) as the information indicating the Aperiodic CSI reporting mode. Further, the base station apparatus 3 may transmit the periodic CSI reporting parameter (cqi-FormatIndicatorPeriodic) as the information indicating the Periodic CSI reporting mode. Periodic CSI Reporting Parameter performs notification as to which type out of Wideband CQI and Subband CQI (UE selected subband CQI) is to be used. Here, the wideband CQI and the subband CQI are CQI feedbacks. Further, the terminal apparatus 1 may determine the PMI feedback type based on the transmission mode. Namely, the terminal apparatus 1 may determine whether to transmit the PMI based on the transmission mode. Furthermore, a single PMI and/or multiple PMIs may be transmitted. Alternatively, the terminal apparatus 1 may also determine whether to transmit the RI based on the transmission mode. Namely, the periodic CSI reporting mode of the terminal apparatus 1 is implicitly given according to the periodic CSI reporting parameter and the transmission mode.

Figure 5A:
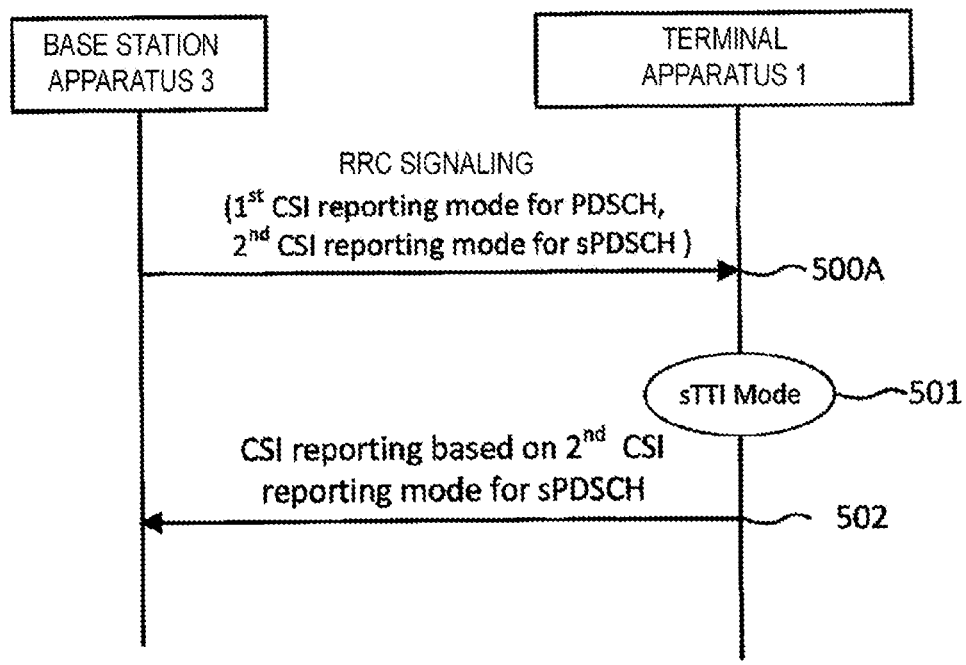
FIG. 5A is an example for explaining a method of transmitting channel state information in aspect D of the present embodiment.
Figure 5B:
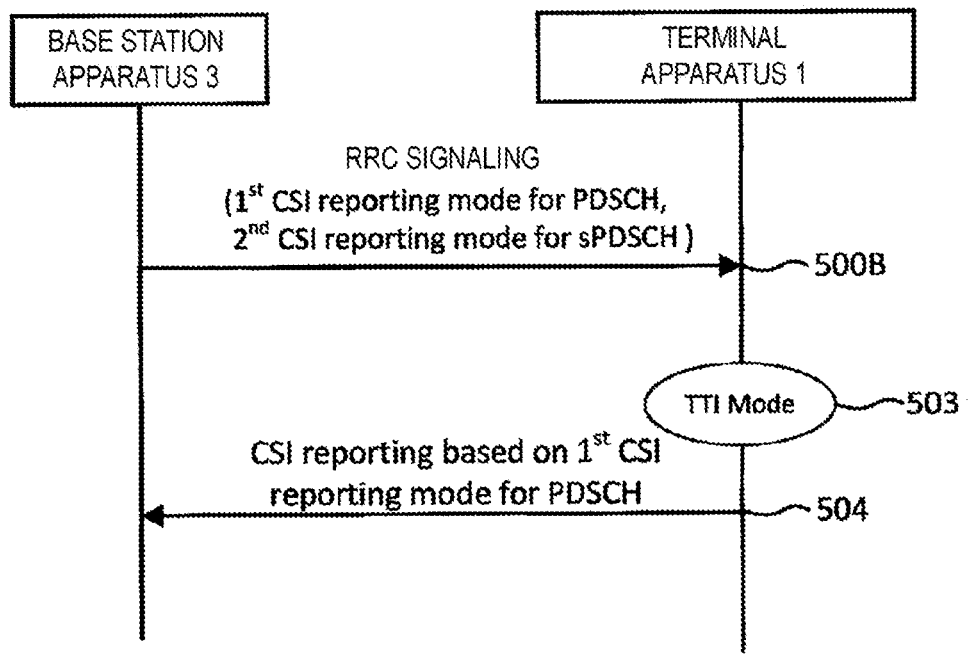
FIG. 5B is another example for explaining a method of transmitting channel state information in aspect D of the present embodiment.

FIGS. 5A and 5B are examples for explaining a method of transmitting channel state information in aspect D of the present embodiment.

For example, the base station apparatus 3 may configure the first CSI reporting parameter and the second CSI reporting parameter by using a higher layer signal (for example, RRC signaling). The first CSI reporting parameter may be used to configure the CSI reporting mode for the transmission mode for the PDSCH (TTI mode). In addition, the second CSI reporting parameter may be used to configure the CSI reporting mode for the transmission mode for the sPDSCH (sTTI mode).

Namely, the first CSI reporting parameter may indicate the first CSI reporting mode. Also, the second CSI reporting parameter may indicate the second CSI reporting mode.

Namely, the terminal apparatus 1 may (i) receive the first CSI reporting parameter indicating the first CSI reporting mode and the second CSI reporting parameter indicating the second CSI reporting mode, (ii) select one out of the first CSI reporting parameter and the second CSI reporting parameter based on the transmission mode of the PDSCH and the transmission mode of the sPDSCH, and (iii) derive the CSI based on the CSI reporting mode that corresponds to the one selected.

For example, in step 500A of FIG. 5A, the base station apparatus 3 transmits the first CSI reporting parameter and the second CSI reporting parameter to the terminal apparatus 1 by using RRC signaling.

In step 501 of FIG. 5A, whether the terminal apparatus 1 is in the TTI mode or the sTTI mode is determined. Here, whether the terminal apparatus 1 is in the TTI mode or the sTTI mode may be determined based on aspect A, aspect B, or aspect C. Further, the base station apparatus 3 may notify the information indicating the TTI mode or the sTTI mode to the terminal apparatus 1 using RRC signaling. For example, in step 501 of FIG. 5A, the terminal apparatus 1 configures the sTTI mode based on the reception of the RRC signaling notifying the sTTI mode.

In step 502 of FIG. 5A, the terminal apparatus 1 configured in the sTTI mode may select the second CSI reporting mode for the sPDSCH transmission mode out of the two CSI reporting modes based on the first CSI reporting parameter and the second CSI reporting parameter received in step 500A of FIG. 5A, and perform CSI reporting based on the selected second CSI reporting mode.

Further, for example, in step 500B of FIG. 5B, the base station apparatus 3 transmits the first CSI reporting parameter and the second CSI reporting parameter to the terminal apparatus 1 by using RRC signaling.

In step 503 of FIG. 5B, whether the terminal apparatus 1 is in the TTI mode or the sTTI mode is determined. Here, whether the terminal apparatus 1 is in the TTI mode or the sTTI mode may be determined based on aspect A, aspect B, or aspect C. Further, the base station apparatus 3 may notify the information indicating the TTI mode or the sTTI mode to the terminal apparatus 1 by using RRC signaling. For example, in step 503 of FIG. 5B, the terminal apparatus 1 configures the TTI mode based on the reception of the RRC signaling notifying the TTI mode.

In step 504 of FIG. 5B, the terminal apparatus 1 configured in the TTI mode may select the first CSI reporting mode for the PDSCH transmission mode out of the two CSI reporting modes based on the first CSI reporting parameter and the second CSI reporting parameter received in step 500B of FIG. 5B, and perform CSI reporting based on the selected first CSI reporting mode.

The examples illustrated in FIGS. 5A and 5B may be used for aperiodic CSI reporting. Also, the examples illustrated in FIGS. 5A and 5B may be used for periodic CSI reporting.

Figure 6A:
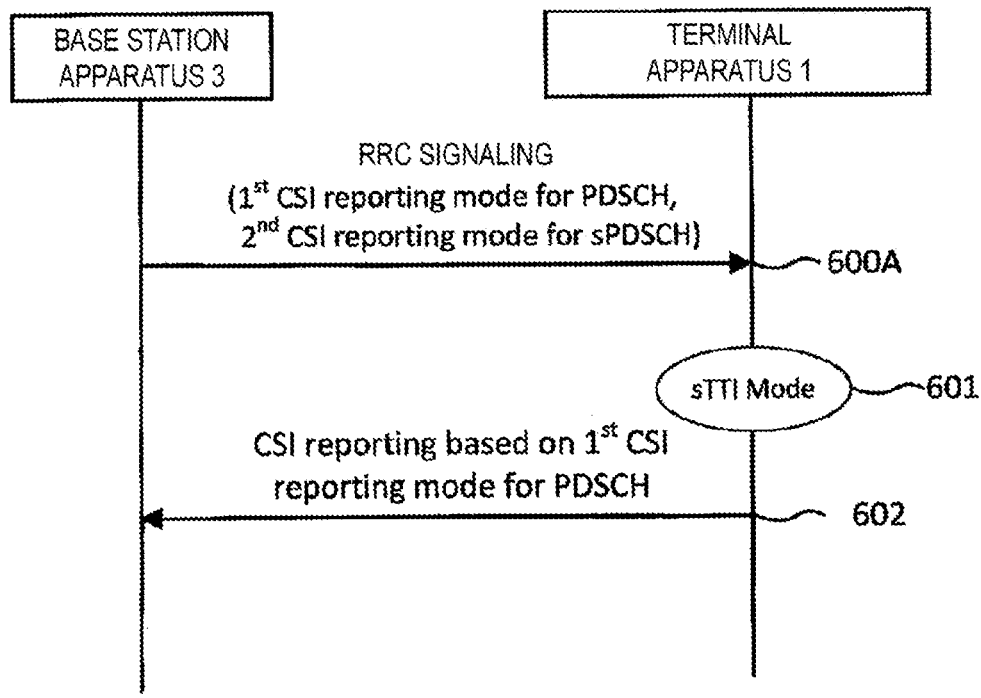
FIG. 6A is a sequence diagram illustrating an example of a method of transmitting channel state information in aspect D of the present embodiment.
Figure 6B:
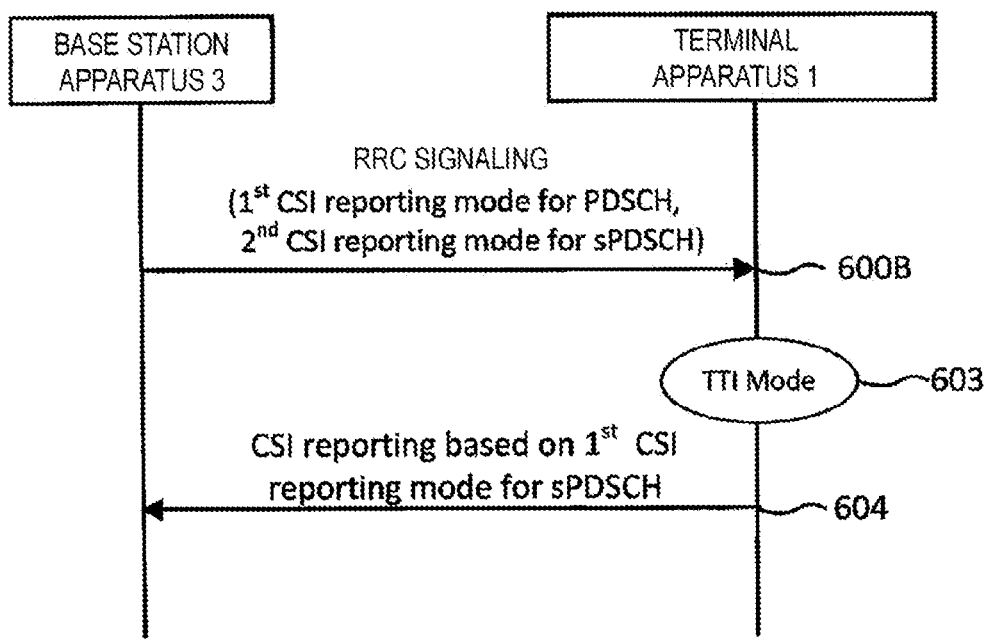
FIG. 6B is a sequence diagram illustrating another example of a method of transmitting channel state information in aspect D of the present embodiment.

FIGS. 6A and 6B are sequence diagrams illustrating examples of a method of transmitting channel state information in aspect D of the present embodiment. FIGS. 6A and 6B may be examples for limiting FIGS. 5A and 5B. As illustrated in FIGS. 5A and 5B described above, two CSI reporting parameters are configured for the terminal apparatus 1. In addition, in a case that at least one of the following including, the transmission mode for the PDSCH or the transmission mode for the sPDSCH is configured to the MIMO spatial multiplexing scheme, the terminal apparatus 1, irrespective of whether the terminal apparatus 1 is in the sTTI mode or the TTI mode, may select a CSI reporting parameter capable of supporting MIMO spatial multiplexing out of the first CSI reporting parameter and the second CSI reporting parameter, and perform CSI reporting for scheduling of MIMO spatial multiplexing.

More specifically, in step 600A of FIG. 6A, the base station apparatus 3 transmits the first CSI reporting parameter and the second CSI reporting parameter to the terminal apparatus 1 by using RRC signaling. In addition, the first CSI reporting parameter may be configured for MIMO spatial multiplexing. For example, the first CSI reporting parameter is configured to the transmission scheme for the PDSCH to be subjected to MIMO spatial multiplexing.

In step 601 of FIG. 6A, the terminal apparatus 1 receives the RRC signaling notifying the sTTI mode, and configures the sTTI mode.

In step 602 of FIG. 6A, the terminal apparatus 1 configured in the sTTI mode may perform the CSI reporting by using the first CSI reporting mode for the transmission mode of the PDSCH corresponding to MIMO spatial multiplexing, out of two CSI reporting modes based on the first CSI reporting parameter and the second CSI reporting parameter received in step 600A of FIG. 6A.

Further, for example, in step 600B of FIG. 6B, the base station apparatus 3 transmits the first CSI reporting parameter and the second CSI reporting parameter to the terminal apparatus 1 by using RRC signaling. Further, the first CSI reporting parameter may be configured for MIMO spatial multiplexing. For example, the first CSI reporting parameter is configured to the transmission scheme for the PDSCH to be subjected to MIMO spatial multiplexing.

In step 603 of FIG. 6B, the terminal apparatus 1 receives the RRC signaling notifying the TTI mode and configures the TTI mode.

In step 604 of FIG. 6B, the terminal apparatus 1 configured in the TTI mode may perform the CSI reporting by using the first CSI reporting mode for the transmission mode of the PDSCH corresponding to MIMO spatial multiplexing, out of two CSI reporting modes based on the first CSI reporting parameter and the second CSI reporting parameter received in step 600B of FIG. 6B.

Hereinafter, aspect E according to the present embodiment will be described.

The base station apparatus 3 may configure one common first CSI reporting parameter using a higher layer signal (for example, RRC signaling). Here, the first CSI reporting parameter may indicate the first CSI reporting mode. Also, the first CSI reporting parameter may indicate one CQI feedback type. In aspect E of the present embodiment, the terminal apparatus 1 may receive the first CSI reporting parameter, and determine the contents of CSI, based on the transmission mode of the PDSCH (TTI mode), the transmission mode of the sPDSCH (sTTI mode), and the first CSI reporting parameter.

FIGS. 7A and 7B are diagrams illustrating an example of determining aperiodic CSI content in a case that the first aperiodic CSI reporting parameter in aspect E of the present embodiment is configured in common. Here, the first CSI reporting parameter may be the first aperiodic CSI reporting parameter.

A common first aperiodic CSI reporting parameter may indicate the same CSI reporting mode for the PDSCH and the sPDSCH. Namely, the base station apparatus 3 transmits the first aperiodic CSI reporting parameter to the terminal apparatus 1. The terminal apparatus 1 may receive the first aperiodic CSI reporting parameter used for determining the content of the CSI, and may determine the contents of the CSI based on the transmission mode of the PDSCH, the transmission mode of the sPDSCH, and the first aperiodic CSI reporting parameter.

FIG. 7A is an example of a case in which the transmission mode for the PDSCH and the transmission mode for the sPDSCH are different. FIG. 7B is an example of a case in which the transmission mode for the PDSCH and the transmission mode for the sPDSCH are the same.

Hereinafter, FIG. 7A will be described. First, the terminal apparatus 1 determines the transmission mode for which the aperiodic CSI is to be measured, out of the transmission mode for the PDSCH and the transmission mode for the sPDSCH. Here, the terminal apparatus 1 may determine the transmission mode for which the aperiodic CSI is to be measured, out of the transmission mode for the PDSCH and the transmission mode for the sPDSCH, based on aspect A, aspect B, or aspect C. The terminal apparatus 1 determines the aperiodic CSI reporting mode and the contents of the CSI to be fed back, based on the determined transmission mode for the PDSCH or the sPDSCH and the first aperiodic CSI reporting parameter.

For example, in a case that the first aperiodic CSI reporting mode is supported for the determined transmission mode for the PDSCH or the sPDSCH, the terminal apparatus 1 may perform CSI reporting based on the first aperiodic CSI reporting mode. Whether a first aperiodic CSI reporting mode is supported for a certain transmission mode may be predefined by a specification or the like.

Also, for example, in a case that the first aperiodic CSI reporting mode is not supported for the determined transmission mode for the PDSCH or the sPDSCH, the terminal apparatus 1 may switch the CSI reporting mode in the horizontal direction as illustrated by an arrow in FIG. 7A, based on the first aperiodic CSI reporting mode.

Specifically, for example, the base station apparatus 3 configures the transmission mode for the PDSCH to the transmission mode TM4 and the transmission mode for the sPDSCH to the transmission mode TM2, and transmits the RRC signaling indicating the configuration to the terminal apparatus 1. Here, for the transmission mode TM4 for the PDSCH, mode 1-2, mode 2-2, mode 3-1, mode 3-2, and mode 1-1 are supported. For the transmission mode TM2 for the sPDSCH, mode 2-0, mode 3-0 and mode 1-0 are supported. Furthermore, the first aperiodic CSI reporting parameter indicates mode 3-2. In a case that the terminal apparatus 1 assumes the transmission mode of the PDSCH for deriving the CSI, the CSI may be derived based on mode 3-2 which is the configured first aperiodic CSI reporting mode, and reported to the base station apparatus 3. In a case that the terminal apparatus 1 assumes the transmission mode of the sPDSCH for deriving the CSI, the CSI may be reported to the base station apparatus 3 based on mode 3-0. The mode 3-0 may be determined by searching the mode in the same horizontal direction as the mode 3-2 in FIG. 7A (the mode of the same CQI feedback type and the different PMI feedback type). The mode 3-0 has different PMI feedback type from the mode 3-2, but has the same CQI feedback type. Namely, in a case that the first aperiodic CSI reporting mode is not supported for the transmission mode of the sPDSCH, the aperiodic CSI reporting mode for the transmission mode of the sPDSCH may be switched from the mode 3-2, which is the first aperiodic CSI reporting mode configured from the base station apparatus 3, to the mode 3-0. Namely, the terminal apparatus 1 may report the CSI to the base station apparatus 3 based on the mode 3-0.

FIG. 7B is a diagram illustrating an example of a case in which the base station apparatus 3 configures the transmission mode for each of the PDSCH and the sPDSCH to one common transmission mode in the terminal apparatus 1. For the PDSCH transmission mode and the sPDSCH transmission mode configured to the common transmission mode, the same aperiodic CSI reporting mode is supported. Namely, the terminal apparatus 1 may report the CSI to the base station apparatus 3 based on the first aperiodic CSI reporting mode.

Further, in the case of the transmission mode for the sPDSCH, the terminal apparatus 1 may switch the first aperiodic CSI reporting mode from a mode to another mode in the vertical direction as illustrated by an arrow in FIG. 7B (a mode of a different CQI feedback type and the same PMI feedback type), based on the configured first aperiodic CSI reporting mode. More specifically, the terminal apparatus 1 may switch the first aperiodic CSI reporting mode to a mode that includes a wideband CQI (mode 1-0, mode 1-1, and mode 1-2), based on the configured first aperiodic CSI reporting mode. Namely, for the CSI reporting for the transmission mode for the sPDSCH, the mode including the wideband CQI whose payload size (the number of bits) is small (mode 1-0, mode 2-0, mode 3-0), may be used.

For example, the base station apparatus 3 configures the transmission mode for each of the PDSCH and the sPDSCH to the common transmission mode TM2, and transmits the RRC signaling indicating the configuration to the terminal apparatus 1. Namely, mode 2-0, mode 3-0 and mode 1-0 are supported for the transmission mode TM2 for the PDSCH and the sPDSCH. Furthermore, a common first aperiodic CSI reporting mode is configured to mode 3-0. In a case that the terminal apparatus 1 assumes the transmission mode for the PDSCH for deriving the CSI, the CSI may be derived based on mode 3-0 which is the configured first aperiodic CSI reporting mode, and reported to the base station apparatus 3. In a case that the terminal apparatus 1 assumes the transmission mode for the sPDSCH for deriving the CSI, the CSI may be derived based on mode 3-0 which is the configured first aperiodic CSI reporting mode, and reported to the base station apparatus 3. Further, in a case that the terminal apparatus 1 assumes the transmission mode for the sPDSCH for deriving the CSI, in order to derive the CSI, switching to mode 1-0 including wideband CQI may be performed, the mode 1-0 being in the same vertical direction as the mode 3-0 which is the configured first aperiodic CSI reporting mode in FIG. 7B. Here, the aperiodic CSI reporting mode for the transmission mode for the sPDSCH may be switched from the mode 3-0, which is the first aperiodic CSI reporting mode configured by the base station apparatus 3, to the mode 1-0. Namely, the terminal apparatus 1 may report the CSI to the base station apparatus 3 based on the mode 1-0.

In addition, as described above, the first CSI reporting parameter may indicate one CQI feedback type. For example, in a case that the transmission mode for the PDSCH and the transmission mode for the sPDSCH are different, the first CSI reporting parameter may indicate one common CQI feedback type. Namely, the terminal apparatus 1 may determine the content of the CSI based on the combination of the CQI feedback type given by the first CSI reporting parameter and the PMI feedback type determined by the transmission mode of the PDSCH or the sPDSCH.

FIGS. 8A and 8B are diagrams illustrating an example of determining the content of periodic CSI in a case that the first periodic CSI reporting parameter in aspect E of the present embodiment is configured in common for the PDSCH and the sPDSCH. Here, the first CSI reporting parameter may be a first periodic CSI reporting parameter.

The common first periodic CSI reporting parameter may indicate the same CQI feedback type for the PDSCH and the sPDSCH. Namely, the base station apparatus 3 transmits the first periodic CSI reporting parameter to the terminal apparatus 1.

FIG. 8A is an example of a case in which the transmission mode for the PDSCH and the transmission mode for the sPDSCH are different. FIG. 8B is an example of a case in which the transmission mode for the PDSCH and the transmission mode for the sPDSCH are the same.

Hereinafter, FIG. 8A will be described. First, the terminal apparatus 1 determines the transmission mode for which the periodic CSI is measured, out of the transmission mode for the PDSCH and the transmission mode for the sPDSCH. Here, the terminal apparatus 1 may determine the transmission mode for which the periodic CSI is measured, out of the transmission mode for the PDSCH or the transmission mode for the sPDSCH, based on aspect A, aspect B, or aspect C. The terminal apparatus 1 determines the periodic CSI reporting mode and the contents of the CSI to be fed back, based on the determined transmission mode of the PDSCH or the sPDSCH and the first periodic CSI reporting parameter.

In a case that the transmission mode for the PDSCH and the transmission mode for the sPDSCH are different, the first periodic CSI reporting parameter may indicate a common CQI feedback type for the transmission mode for the PDSCH and the transmission mode for the sPDSCH. In addition, the PMI feedback type of CSI reporting for the PDSCH is determined by the transmission mode for the PDSCH. The PMI feedback type of CSI reporting for the sPDSCH is determined by the transmission mode for the sPDSCH. Namely, the terminal apparatus 1 determines the contents of CSI to be fed back based on the combination of the common CQI feedback type and the PMI feedback type determined by the transmission mode.

Specifically, for example, the base station apparatus 3 configures the transmission mode for the PDSCH to the transmission mode TM 4, configures the transmission mode for the sPDSCH to the transmission mode TM 2, and transmits the RRC signaling indicating the configuration to the terminal apparatus 1. Here, mode 1-2 and mode 2-1 are supported for the transmission mode TM4 for the PDSCH. Mode 2-0 and mode 1-0 are supported for the transmission mode TM 2 for the sPDSCH. Furthermore, the common first periodic CSI reporting parameter is configured to the subband CQI feedback type.

In a case that the terminal apparatus 1 assumes the transmission mode for the PDSCH for deriving the CSI, the PMI feedback type used for the CSI reporting is determined to be a single PMI type. Namely, the PMI feedback type used for the CSI reporting may be determined to be the mode 2-1. Here, the terminal apparatus 1 may perform reporting to the base station apparatus 3 based on the contention indicated in the determined mode 2-1.

Further, in a case that the terminal apparatus 1 assumes the transmission mode for the sPDSCH for deriving CSI, the PMI feedback type used for CSI reporting is determined to be a "no PMI" type. Namely, the PMI feedback type used for CSI reporting is determined to be the mode 2-0. Here, the terminal apparatus 1 may perform reporting to the base station apparatus 3 based on the contention indicated in the determined mode 2-0.

FIG. 8B is a diagram illustrating an example of a case in which the base station apparatus 3 configures the transmission mode for each of the PDSCH and the sPDSCH as one common transmission mode in the terminal apparatus 1. The same periodic CSI reporting mode is supported for the transmission mode of the PDSCH and the transmission mode of the sPDSCH configured as the common transmission mode. Namely, the terminal apparatus 1 may report the CSI to the base station apparatus 3 based on the common transmission mode and the first periodic CSI reporting parameter.

In a case that the transmission mode for the PDSCH and the transmission mode for the sPDSCH are the same, the first periodic CSI reporting parameter may indicate a common CQI feedback type for the transmission mode for the PDSCH and the transmission mode for the sPDSCH. In addition, the PMI feedback type may be determined based on the common transmission mode. In addition, the CQI feedback type of CSI reporting for the sPDSCH may be configured to a wideband CQI type.

Namely, in a case of the transmission mode for the sPDSCH, the CQI feedback type of CSI reporting for the sPDSCH may be configured to a wideband CQI feedback type. Namely, based on the first periodic CSI reporting parameter indicating the common CQI feedback type, the terminal apparatus 1 may switch the periodic CSI reporting mode from a mode to another mode in the vertical direction as illustrated by an arrow in FIG. 8B (a mode of a different CQI feedback type and the same PMI feedback type). Specifically, the terminal apparatus 1 may switch to a mode including the wideband CQI feedback type (mode 1-0, mode 1-1) based on the first periodic CSI reporting parameter. Namely, the CSI reporting for the transmission mode for the sPDSCH may use a mode, including a wideband CQI, whose payload size (the number of bits) for indicating the contents of the CSI is small.

For example, the base station apparatus 3 configures the transmission mode for each of the PDSCH and the sPDSCH as the common transmission mode TM4, and performs transmission to the terminal apparatus 1 by using the RRC signaling. Mode 1-1 and mode 2-1 are supported for the transmission mode TM4 for the PDSCH and the sPDSCH. Namely, the terminal apparatus 1 determines the PMI feedback type used for CSI reporting to be a single PMI type. Furthermore, a common first periodic CSI reporting parameter is configured to a subband CQI feedback type. In a case that the terminal apparatus 1 assumes the transmission mode for the PDSCH for deriving the CSI, the CSI may be derived based on the configured mode 2-1, and reported to the base station apparatus 3. In a case that the terminal apparatus 1 assumes the transmission mode for the sPDSCH for deriving the CSI, the CSI may be derived based on the configured mode 2-1, and the CSI may be reported to the base station apparatus 3. Further, in a case that the terminal apparatus 1 assumes the transmission mode for the sPDSCH for deriving the CSI, in order to derive the CSI, switching to a mode may be performed, the mode being in the same vertical direction as the mode 2-1 which is the configured mode in FIG. 8B, and including wideband CQI feedback type. Here, the periodic CSI reporting mode for the transmission mode for the sPDSCH may be switched from the mode 2-1 to the mode 1-1. Namely, the terminal apparatus 1 may perform reporting to the base station apparatus 3 based on the content indicated in the mode 1-1.

Aspect E may be used for aperiodic CSI reporting.

In the above descriptions, the aspects, according to the present embodiment, for determining the content of the CSI and/or the CSI reporting mode are described as different examples. Namely, according to the present embodiment, the terminal apparatus 1 and the base station apparatus 3 may determine the content of the CSI and/or the CSI reporting mode at least based on some or all of the following elements (A) to (G).

Element A: Type of a downlink physical channel allocated to a CSI reference resource or allocated before and closest to the CSI reference resource Element B: Type of the downlink physical channel including the UL grant including the CSI request field set to trigger the transmission of the CSI Element C: Transmission scheme of the downlink physical channel Element D: Transmission mode of the PDSCH Element E: Transmission mode of the sPDSCH Element F: Payload size (the number of bits) for indicating the content of the CSI Element G: Physical parameter of the downlink physical channel (numerology)

Here, for the element G, the physical parameter may be a parameter related to the signal waveform of the downlink physical channel, for example. The parameters related to the signal waveform may be the number of symbols, the signal waveform, the subcarrier spacing, the CP length, the sample cycle, and the like, applied to the downlink physical channel.

Configurations of apparatuses according to the present embodiment will be described below.

Figure 9:
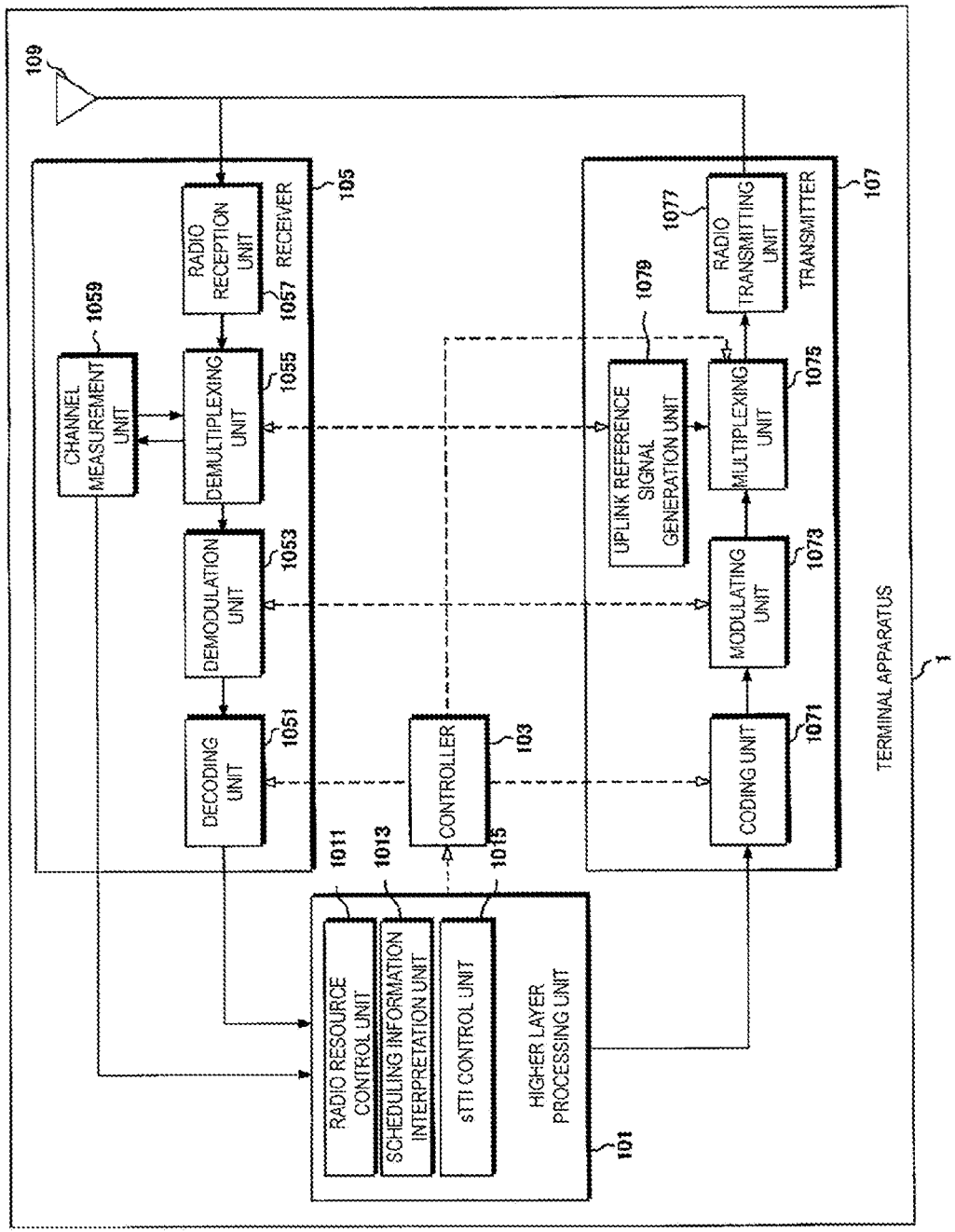
FIG. 9 is a schematic block diagram illustrating a configuration of the terminal apparatus 1 according to the present embodiment.

FIG. 9 is a schematic block diagram illustrating the configuration of the terminal apparatus 1 according to present embodiment. As illustrated in the drawing, the terminal apparatus 1 is configured to include a higher layer processing unit 101, a controller 103, a receiver 105, a transmitter 107, and a transmit and receive antenna 109. In addition, the higher layer processing unit 101 is configured to include a radio resource control unit 1011, a scheduling information interpretation unit 1013, and an sTTI control unit 1015. The receiver 105 is configured to include a decoding unit 1051, a demodulation unit 1053, a demultiplexing unit 1055, a radio receiving unit 1057, and a channel measurement unit 1059. The transmitter 107 is configured to include a coding unit 1071, a modulating unit 1073, a multiplexing unit 1075, a radio transmitting unit 1077, and an uplink reference signal generation unit 1079.

The higher layer processing unit 101 outputs the uplink data (the transport block) generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various configuration information/parameters of its own apparatus. The radio resource control unit 1011 sets the various configuration information/parameters in accordance with higher layer signaling received from the base station apparatus 3. Namely, the radio resource control unit 1011 sets the various configuration information/parameters in accordance with the information indicating the various configuration information/parameters received from the base station apparatus 3. Furthermore, the radio resource control unit 1011 generates the information to be mapped to each uplink channel, and performs outputting to the transmitter 107. The radio resource control unit 1011 is also referred to as a configuration unit 1011.

Here, the scheduling information interpreting unit 1013 included in the higher layer processing unit 101 interprets the DCI format (the scheduling information, the UL grant) received via the receiving unit 105, and based on the result of interpreting the DCI format generates control information for controlling the receiver 105 and the transmitter 107 to output the control information to the controller 103.

In addition, the sTTI control unit 1015 included in the higher layer processing unit 101 performs control related to the sTTI transmission based on the various configuration information, and the information such as a parameter as well as the state related to the SPS.

In accordance with the control information from the higher layer processing unit 101, the controller 103 generates a control signal for controlling the receiver 105 and the transmitter 107. The controller 103 outputs the generated control signal to the receiver 105 and the transmitter 107 to control the receiver 105 and the transmitter 107.

In addition, in accordance with the control signal input from the controller 103, the receiver 105 demultiplexes, demodulates, and decodes a reception signal received from the base station apparatus 3 through the transmit and receive antenna 109, and outputs the information resulting from the decoding, to the higher layer processing unit 101.

The radio reception unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

Further, the demultiplexing unit 1055 demultiplexes the extracted signal into the PHICH, the PDCCH, the PDSCH, and the downlink reference signal, respectively. Further, the demultiplexing unit 1055 performs channel compensation of the PHICH, the PDCCH, and the PDSCH based on the estimated value of the channel input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH addressed to its own apparatus and outputs the HARQ indicator resulting from the decoding to the higher layer processing unit 101. The demodulation unit 1053 demodulates the PDCCH in compliance with the QPSK modulation scheme and performs the output to the decoding unit 1051. The decoding unit 1051 attempts to decode the PDCCH, and in a case that the decoding is successful, outputs the decoded downlink control information and the RNTI to which the downlink control information corresponds to the higher layer processing unit 101.

In addition, the demodulation unit 1053 demodulates the PDSCH in compliance with the modulation scheme notified by the DL grant such as QPSK (Quadrature Phase Shift Keying), 16 QAM (Quadrature Amplitude Modulation), and 64 QAM, and performs outputting to the decoding unit 1051. The decoding unit 1051 performs the decoding in accordance with the information on a coding rate notified in the downlink control information, and outputs the decoded downlink data (the transport block) to the higher layer processing unit 101.

The channel measurement unit 1059 measures a path loss or a channel state of the downlink from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and performs outputting to the demultiplexing unit 1055. The channel measurement unit 1059 performs channel measurement and/or interference measurement in order to calculate the CQI (or alternatively the CSI).

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and performs transmission to the base station apparatus 3 through the transmit and receive antenna 109. Furthermore, the transmitter 107 transmits the uplink control information.

The coding unit 1071 performs coding, such as convolutional coding or block coding, on the uplink control information input from the higher layer processing unit 101. Furthermore, the coding unit 1071 performs turbo coding in accordance with the information used for the scheduling of the PUSCH.

The modulating unit 1073 modulates coded bits input from the coding unit 1071, in compliance with the modulation scheme notified in the downlink control information, such as BPSK, QPSK, 16 QAM, or 64 QAM, or in compliance with a modulation scheme predetermined in advance for each channel. In accordance with the information used for the scheduling of the PUSCH, the modulating unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences.

In addition, the uplink reference signal generation unit 1079 generates a sequence determined by a predetermined rule (expression), based on a physical layer cell identity (referred to as a PCI, a cell ID, and the like) for identifying the base station apparatus 3, a bandwidth in which an uplink reference signal is allocated, a cyclic shift notified by a UL grant, a value of a parameter for generation of a DMRS sequence, and the like. The multiplexing unit 1075 rearranges modulation symbols of the PUSCH in parallel in accordance with the control signal input from the controller 103, and then performs the Discrete Fourier Transform (DFT). Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmitting unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, performs up-conversion to a signal of a carrier frequency, performs power amplification, and performs outputting to the transmit and receive antenna 109 for transmission.

Figure 10:
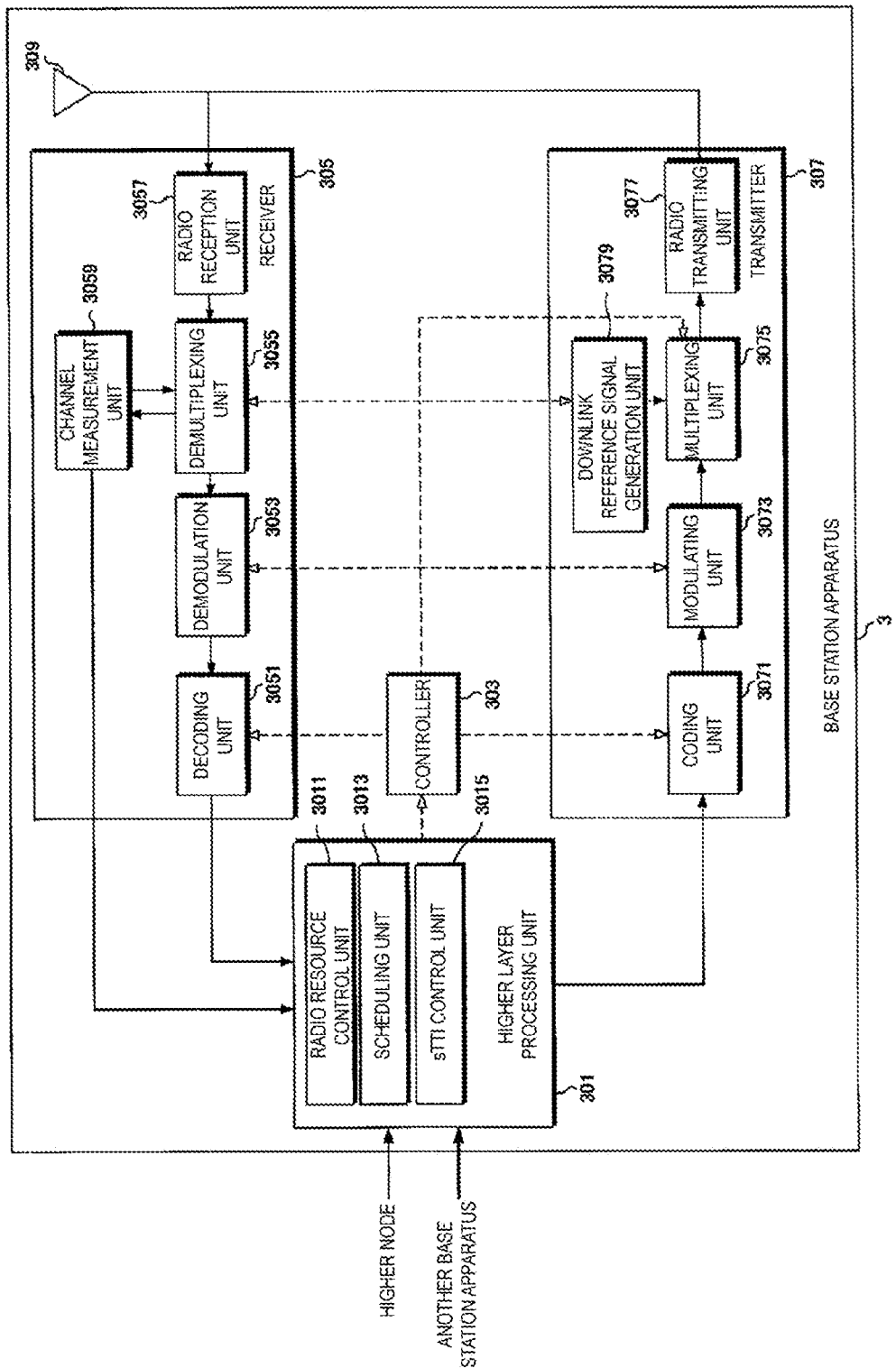
FIG. 10 is a schematic block diagram illustrating a configuration of a base station apparatus 3 according to the present embodiment.

FIG. 10 is a schematic block diagram illustrating the configuration of the base station apparatus 3 according to the present embodiment. As illustrated in the figure, the base station apparatus 3 is configured to include a higher layer processing unit 301, a controller 303, a receiver 305, a transmitter 307, and a transmit and receive antenna 309. Further, the higher layer processing unit 301 is configured to include a radio resource control unit 3011, a scheduling unit 3013, and an sTTI control unit 3015. The receiver 305 is configured to include a decoding unit 3051, a demodulation unit 3053, a demultiplexing unit 3055, a radio reception unit 3057, and a channel measurement unit 3059. The transmitter 307 is configured to include a coding unit 3071, a modulating unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates the control information for control of the receiver 305 and the transmitter 307, and performs outputting to the controller 303.

The radio resource control unit 3011 included in the higher layer processing unit 301 generates, or acquires from a higher node, the downlink data (the transport block) mapped to the downlink PDSCH, the system information, the RRC message, the MAC Control Element (CE), and the like, and performs outputting to the transmitter 307. Furthermore, the radio resource control unit 3011 manages the various configuration information/parameters for each of the terminal apparatuses 1. The radio resource control unit 3011 may set the various configuration information/parameters for each of the terminal apparatuses 1 through higher layer signaling. Namely, the radio resource control unit 1011 transmits/broadcasts the information indicating various configuration information/parameters. The radio resource control unit 3011 is also referred to as a configuration unit 3011.

The scheduling unit 3013 included in the higher layer processing unit 301 determines a frequency and a subframe to which the physical channels (PDSCH and PUSCH) are allocated, the coding rate and modulation scheme for the physical channels (the PDSCH and the PUSCH), the transmit power, and the like, from the received channel state information and from the channel estimate, channel quality, or the like input from the channel measurement unit 3059. The scheduling unit 3013 generates the control information (for example, the DCI format) for controlling the receiver 305 and the transmitter 307 in accordance with a result of the scheduling, and performs outputting to the controller 303. The scheduling unit 3013 further determines timing of performing transmission processing and reception processing.

In addition, the sTTI control unit 3015 included in the higher layer processing unit 301 performs control related to the SPS, based on the various configuration information and parameters, and the information such as a parameter as well as the state related to the SPS.

In accordance with the control information from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and receive antenna 309, and outputs the information resulting from the decoding to the higher layer processing unit 301. The radio reception unit 3057 converts (down-converts) an uplink signal received through the transmit and receive antenna 309 to a baseband signal through orthogonal demodulation, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal. The receiver 305 receives the uplink control information.

The radio reception unit 3057 removes a portion corresponding to a Cyclic Prefix (CP) from the digital signal resulting from the conversion. The radio reception unit 3057 performs Fast Fourier Transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed based on the allocation information of radio resources included in the UL grant which the base station apparatus 3 has determined in advance by using the radio resource control unit 3011 and notified to each terminal apparatus 1. Furthermore, the demultiplexing unit 3055 performs channel compensation of the PUCCH and the PUSCH based on the estimated value of the channel input from the channel measurement unit 3059. Furthermore, the demultiplexing unit 3055 outputs an uplink reference signal resulting from the demultiplexing, to the channel measurement unit 3059.

In addition, the demodulation unit 3053 performs inverse Discrete Fourier Transform (IDFT) of the PUSCH, obtains modulation symbols, and performs demodulation of the received signal with respect to each of the PUCCH and the PUSCH modulation symbols, by using a modulation scheme, such as BPSK (Binary Phase Shift Keying), QPSK, 16 QAM, 64 QAM, which is either predetermined or pre-notified by the base station apparatus itself to each terminal apparatus 1 with the UL grant. Demodulation unit 3053 demultiplexes the modulation symbols of a plurality of uplink data transmitted on the same PUSCH by using MIMO SM, based on the number of spatially-multiplexed sequences pre-notified to each terminal apparatus 1 by the UL grant and the information instructing the precoding to be performed on the sequences.

In addition, the decoding unit 3051 decodes the coded bits of the demodulated PUCCH and PUSCH at a coding rate, in compliance with the predefined coding scheme, which is either pre-determined or pre-notified by the base station apparatus itself to the terminal apparatus 1 by the UL grant, and outputs the decoded uplink data and the uplink control information to the higher layer processing unit 101. In a case in which the PUSCH is re-transmitted, the decoding unit 3051 performs the decoding based on the coded bits retained in an HARQ buffer which is input by the higher layer processing unit 301, and the demodulated coded bits. The channel measurement unit 309 measures the channel estimate, the channel quality, and the like, based on the uplink reference signal input from the demultiplexing unit 3055, and performs outputting to the demultiplexing unit 3055 and the higher layer processing unit 301.

Further, the transmitter 307 generates a downlink reference signal according to the control signal input from the controller 303, encodes and modulates the HARQ indicator, the downlink control information, and the downlink data input from the higher layer processing unit 301, multiplexes the PHICH, the PDCCH, the PDSCH, and the downlink reference signal, and transmits a signal to the terminal apparatus 1 via the transmit and receive antenna unit 309.

The coding unit 3071 encodes the HARQ indicator, the downlink control information, and the downlink data that are input from the higher layer processing unit 301, in compliance with the predetermined coding scheme, such as block coding, convolutional coding, or turbo coding, or in compliance with the coding scheme determined by the radio resource control unit 3011. The modulating unit 3073 modulates the coded bits input from the coding unit 3071, in compliance with the predetermined modulation scheme, such as BPSK, QPSK, 16 QAM, or 64 QAM, or in compliance with the modulation scheme determined by the radio resource control unit 3011.

In addition, the downlink reference signal generation unit 3079 generates, as the downlink reference signal, a sequence already known to the terminal apparatus 1 and that is determinable in accordance with a predetermined rule, based on the Physical layer Cell Identifier (PCI) and the like for identifying the base station apparatus 3. The multiplexing unit 3075 multiplexes the modulated modulation symbol of each channel and the generated downlink reference signal. Namely, the multiplexing unit 3075 maps the modulated modulation symbol of each channel and the generated downlink reference signal to the resource elements.

In addition, the radio transmitting unit 3077 performs Inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal to an analog signal, removes unnecessary frequency components through a lowpass filter, performs up-conversion to a signal of a carrier frequency, performs power amplification, and performs outputting to the transmit and receive antenna 309 for transmission.

The various units for constituting the terminal apparatus 1 and the base station apparatus 3 may be circuits. For example, the transmitter 107 may be the transmission circuit 107.

Hereinafter, various aspects of the terminal apparatus 1 and the base station apparatus 3 according to the present embodiment will be described.

(1) Aspect A of the present embodiment is a terminal apparatus 1, including a channel measurement unit 1059 configured to derive CSI, and a transmitter 107 configured to transmit the CSI, wherein, content of the CSI is determined based on a type of a downlink physical channel allocated to a CSI reference resource or allocated before and closest to the CSI reference resource.

(2) In aspect A of the present embodiment, the type of the downlink physical channel may include PDSCH and sPDSCH.

(3) In aspect A of the present embodiment, the content of the CSI includes some or all of CQI, PMI and RI.

(4) Aspect B of the present embodiment is the terminal apparatus 1, including a channel measurement unit 1059 configured to derive CSI, and a transmitter 107 configured to transmit the CSI, wherein, content of the CSI is determined based on a type of a downlink physical channel including the UL grant including the CSI request field which is set to trigger transmission of the CSI.

(5) In aspect B of the present embodiment, the type of the downlink physical channel may include the PDCCH and the sPDCCH.

(6) In aspect B of the present embodiment, the content of CSI includes some or all of CQI, PMI and RI.

(7) Aspect C of the present embodiment is the terminal apparatus 1, including a receiver 105 configured to receive a DL grant used for scheduling a downlink physical channel, the DL grant including a CSI request field set to trigger transmission of CSI, a channel measurement unit 1059 configured to derive CSI, and a transmitter 107 configured to transmit the CSI, wherein, content of the CSI is determined based on a transmission scheme of the downlink physical channel.

(8) In aspect C of the present embodiment, the transmission scheme of the downlink physical channel is given by a DL grant.

(9) Aspect D of the present embodiment is a terminal apparatus 1, including a receiver 105 configured to receive a first CSI reporting parameter for indicating a first CSI reporting mode and a second CSI reporting parameter for indicating a second CSI reporting mode, a channel measurement unit 1059 configured to derive CSI, and a transmitter 107 configured to transmit the CSI, wherein the channel measurement unit 1059 selects one out of the first CSI reporting parameter and the second CSI reporting parameter based on the transmission mode of the PDSCH and the transmission mode of the sPDSCH, and derives the CSI based on the CSI reporting mode corresponding to the one selected.

(10) In aspect D of the present embodiment, in a case that at least one out of the transmission mode of the PDSCH and the transmission mode of the sPDSCH is a transmission mode related to spatial multiplexing, the channel measurement unit 1059 selects the first CSI reporting parameter to be configured for MIMO spatial multiplexing.

(11) Aspect E of the present embodiment is a terminal apparatus 1, including a receiving unit 105 configured to receive a first CSI reporting parameter used for determining content of CSI, a channel measurement unit 1059 configured to derive the CSI, and a transmitter 107 configured to transmit the CSI, wherein the channel measurement unit 1059 determines the content of the CSI based on a transmission mode of the PDSCH, a transmission mode of the sPDSCH, and a first CSI reporting parameter.

(12) In aspect E of the present embodiment, the content of the CSI is determined based on whether the transmission mode of the PDSCH and the transmission mode of the sPDSCH are the same.

(13) Aspect F of the present embodiment is a base station apparatus 3, including a channel measurement unit 3059 configured to derive CSI, and a receiver 305 configured to receive the CSI, wherein content of the CSI is determined based on a type of a downlink physical channel allocated to a CSI reference resource or allocated before and closest to the CSI reference resource.

(14) In aspect F of the present embodiment, the type of downlink physical channel may include PDSCH and sPDSCH.

(15) In aspect F of the present embodiment, the content of CSI includes some or all of CQI, PMI and RI.

(16) Aspect G of the present embodiment is a base station apparatus 3, including a channel measurement unit 3059 configured to derive CSI, and a receiver 305 configured to receive the CSI, wherein content of the CSI is determined based on a type of a downlink physical channel including the UL grant including the CSI request field which is set to trigger transmission of the CSI.

(17) In aspect G of the present embodiment, the type of downlink physical channel may include PDCCH and sPDCCH.

(18) In aspect G of the present embodiment, the content of CSI includes some or all of CQI, PMI and RI.

(19) Aspect H of the present embodiment is a base station apparatus 3, including a transmitter 307 configured to transmit a DL grant used for scheduling a downlink physical channel, the DL grant including a CSI request field set to trigger transmission of CSI, a channel measurement unit 3059 configured to derive CSI, and a receiver 305 configured to receive the CSI, wherein, content of the CSI is determined based on a transmission scheme of the downlink physical channel.

(20) In aspect H of the present embodiment, the transmission scheme of the downlink physical channel is given by a DL grant.

(21) Aspect I of the present embodiment is a base station apparatus 3, including a transmitter 307 configured to transmit a first CSI reporting parameter for indicating a first CSI reporting mode and a second CSI reporting parameter for indicating a second CSI reporting mode, a channel measurement unit 3059 configured to derive CSI, and a receiver 305 configured to receive the CSI, wherein the channel measurement unit 3059 selects one out of the first CSI reporting parameter and the second CSI reporting parameter based on the transmission mode of the PDSCH and the transmission mode of the sPDSCH, and derives the CSI based on the CSI reporting mode corresponding to the one selected.

(22) In aspect I of the present embodiment, in a case that at least one out of the transmission mode of the PDSCH and the transmission mode of the sPDSCH is a transmission mode related to spatial multiplexing, the channel measurement unit 3059 selects the first CSI reporting parameter to be configured for MIMO spatial multiplexing.

(23) Aspect J of the present embodiment is a base station apparatus 3, including a transmitter 307 configured to transmit a first CSI reporting parameter used for determining content of CSI, a channel measurement unit 3059 configured to derive the CSI, and a receiver 305 configured to receive the CSI, wherein the channel measurement unit 3059 determines the content of the CSI based on a transmission mode of the PDSCH, a transmission mode of the sPDSCH, and the first CSI reporting parameter.

(24) In aspect J of the present embodiment, the content of the CSI is determined based on whether the transmission mode of the PDSCH and the transmission mode of the sPDSCH are the same.

This thereby enables the channel state information to be efficiently transmitted. For example, the CSI content used for CSI reporting for the PDSCH and the CSI content used for CSI reporting for the sPDSCH are configured separately. This enables optimized reporting content to be configured, thus allowing channel state information to be efficiently transmitted.

A program running on the base station apparatus 3 and the terminal apparatus 1 according to the present invention may be a program that controls a Central Processing Unit (CPU) and the like in such a manner as to realize the functions of the above-described embodiment according to the present invention. The information handled in these apparatuses is temporarily stored in a Random Access Memory (RAM) while being processed. Thereafter, the information is stored in various types of Read Only Memory (ROM) such as a flash ROM and a Hard Disk Drive (HDD), and as necessary, is read by the CPU to be modified or rewritten.

Note that the terminal apparatus 1 and the base station apparatus 3 according to the above-described embodiment may be partially achieved by a computer. In that case, this may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Further, the base station apparatus 3 according to the embodiment described above can also be realized as an aggregate (an apparatus group) constituted by a plurality of apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Further, the base station apparatus 3 according to the embodiment described above may be Evolved Universal Terrestrial Radio Access Network (EUTRAN). Further, the base station apparatus 3 according to the embodiment described above may have some or all of the functions of the upper node with respect to the eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be independently achieved as a chip, or some or all of the functional blocks may be integrated into a chip. Furthermore, a circuit integration technique is not limited to the LSI, and may be realized with a dedicated circuit or a general-purpose processor. Furthermore, in a case in which with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, one aspect of the present invention can have various modifications within the scope of the present invention defined by claims, and embodiments that are made by suitably combining technical means disclosed according to the different embodiments are also included in the technical scope of the present invention. Furthermore, a configuration in which constituent elements, described in the respective embodiments and having the similar effects, are substituted for one another is also included.

INDUSTRIAL APPLICABILITY

One embodiment of the present invention may be utilized in, for example, a communication system, a communication apparatus (for example, a mobile phone device, a base station apparatus, a wireless LAN apparatus, or a sensor device), an integrated circuit (for example, a communication chip), a program, or the like.

REFERENCE SIGNS LIST 1 (1A, 1B, 1C) Terminal apparatus
3 Base station apparatus
101 Higher layer processing unit
103 Controller
105 Receiver
107 Transmitter
301 Higher layer processing unit
303 Controller
305 Receiver
307 Transmitter
1011 Radio resource control unit
1013 Scheduling information interpretation unit
1015 sTTI control unit
3011 Radio resource control unit
3013 Scheduling unit
3015 sTTI control unit

The invention claimed is:

1. A terminal device comprising:
reception circuitry configured to receive a first parameter indicating a first transmission mode of a first physical downlink shared channel (PDSCH), the first PDSCH being a PDSCH for a first subframe, and receive a second parameter indicating a second transmission mode of a second PDSCH, the second PDSCH being a PDSCH for a first short transmission time interval (TTI); and
decoding circuitry configured to detect a first uplink downlink control information (DCI) used for scheduling a first physical uplink shared channel (PUSCH), the first PUSCH being a PUSCH for a second subframe, and a second uplink DCI used for scheduling a second PUSCH, the second PUSCH being a PUSCH for a second short TTI,
wherein, in a first case that the first uplink DCI detected in a physical downlink control channel (PDCCH) triggers a first aperiodic channel state information (CSI), contents of the first aperiodic CSI are determined based on at least the first transmission mode, and
in a second case that the second uplink DCI detected in a short physical downlink control channel (sPDCCH) triggers a second aperiodic CSI, contents of the second aperiodic CSI are determined based on at least the second transmission mode.

2. The terminal device according to claim 1, wherein
in the first case, whether the first aperiodic CSI includes a rank indication (RI) is given based on at least the first transmission mode, and
in the second case, whether the second aperiodic CSI includes an RI is given based on at least the second transmission mode.

3. The terminal device according to claim 1, wherein
each of the first aperiodic CSI and the second aperiodic CSI includes at least one of a channel quality indicator, a precoding matrix indicator, and a rank indication (RI).

4. The terminal device according to claim 1, wherein
the first subframe is longer than the first short TTI, and
the second subframe is longer than the second short TTI.

5. A base station device comprising:
transmitting circuitry configured to transmit a first parameter indicating a first transmission mode of a first physical downlink shared channel (PDSCH), the first PDSCH being a PDSCH for a first subframe, and transmit a second parameter indicating a second transmission mode of a second PDSCH, the second PDSCH being a PDSCH for a first short transmission time interval (TTI); and
scheduling circuitry configured to generate a first uplink downlink control information (DCI) used for scheduling a first physical uplink shared channel (PUSCH), the first PUSCH being a PUSCH for a second subframe, and a second uplink DCI used for scheduling a second PUSCH, the second PUSCH being a PUSCH for a second short TTI,
wherein, in a first case that the first uplink DCI detected in a physical downlink control channel (PDCCH) triggers a first aperiodic channel state information (CSI), contents of the first aperiodic CSI are determined based on at least the first transmission mode, and in a second case that the second uplink DCI detected in a short physical downlink control channel (sPDCCH) triggers a second aperiodic CSI, contents of the second aperiodic CSI are determined based on at least the second transmission mode.

6. The base station device according to claim 5, wherein
in the first case, whether the first aperiodic CSI includes a rank indication indicator (RI) is given based on at least the first transmission mode, and in the second case, whether the second aperiodic CSI includes an RI is given based on at least the second transmission mode.

7. The base station device according to claim 5, wherein each of the first aperiodic CSI and the second aperiodic CSI includes at least one of a channel quality indicator, a precoding matrix indicator, and a rank indication (RI).

8. The base station device according to claim 5, wherein the first subframe is longer than the first short TTI, the second subframe is longer than the second short TTI.

9. A communication method of a terminal device comprising:

receiving a first parameter indicating a first transmission mode of a first physical downlink shared channel (PDSCH), the first PDSCH being a PDSCH for a first subframe;

receiving a second parameter indicating a second transmission mode of a second PDSCH, the second PDSCH being a PDSCH for a first short transmission time interval (TTI);

detecting a first uplink downlink control information (DCI) used for scheduling a first physical uplink shared channel (PUSCH), the first PUSCH being a PUSCH for a second subframe; and detecting a second uplink DCI used for scheduling a second PUSCH, the second PUSCH being a PUSCH for a second short TTI, wherein, in a first case that the first uplink DCI detected in a physical downlink control channel (PDCCH) triggers a first aperiodic channel state information (CSI), contents of the first aperiodic CSI are determined based on at least the first transmission mode, and in a second case that the second uplink DCI detected in a short physical downlink control channel (sPDCCH) triggers a second aperiodic CSI, contents of the second aperiodic CSI are determined based on at least the second transmission mode.

10. A communication method of a base station device comprising:

transmitting a first parameter indicating a first transmission mode of a first physical downlink shared channel (PDSCH), the first PDSCH being a PDSCH for a first subframe;

transmitting a second parameter indicating a second transmission mode of a second PDSCH, the second PDSCH being a PDSCH for a first short transmission time interval (TTI);

generating a first uplink downlink control information (DCI) used for scheduling a first physical uplink shared channel (PUSCH), the first PUSCH being a PUSCH for a second subframe; and generating a second uplink DCI used for scheduling a second PUSCH, the second PUSCH being a PUSCH for a second short TTI, wherein, in a first case that the first uplink DCI detected in a physical downlink control channel (PDCCH) triggers a first aperiodic channel state information (CSI), contents of the first aperiodic CSI are determined based on at least the first transmission mode, and in a second case that the second uplink DCI detected in a short physical downlink control channel (sPDCCH) triggers a second aperiodic CSI, contents of the second aperiodic CSI are determined based on at least the second transmission mode.

* * * * *